US006533674B1

(12) United States Patent
Gobush

(10) Patent No.: US 6,533,674 B1
(45) Date of Patent: *Mar. 18, 2003

(54) MULTISHUTTER CAMERA SYSTEM

(75) Inventor: William Gobush, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/379,592

(22) Filed: Aug. 24, 1999

Related U.S. Application Data

(63) Continuation of application No. 09/156,611, filed on Sep. 18, 1998, now Pat. No. 6,241,622.

(51) Int. Cl.$^7$ ............................................... A63B 69/36
(52) U.S. Cl. ........................................ 473/199; 473/409
(58) Field of Search ..................... 473/131, 199–200, 473/219–226, 140, 141, 409; 700/91–92; 348/207, 296, 169, 207.99, 207.1, 207.11, 211.11

(56) References Cited

U.S. PATENT DOCUMENTS

| | | | |
|---|---|---|---|
| 3,513,707 A | 5/1970 | Russell et al. | 273/183 |
| 3,918,073 A | 11/1975 | Henderson et al. | 354/120 |
| 4,063,259 A | 12/1977 | Lynch et al. | 354/120 |
| 4,136,387 A | 1/1979 | Sullivan et al. | 364/410 |
| 4,137,566 A | 1/1979 | Haas et al. | 364/410 |
| 4,158,853 A | 6/1979 | Sullivan et al. | 358/93 |
| 4,160,942 A | 7/1979 | Lynch et al. | 350/120 |
| 4,375,887 A | 3/1983 | Lynch et al. | 273/32 |
| 4,461,477 A | 7/1984 | Stewart | 273/26 R |
| 4,477,079 A | 10/1984 | White | 273/186 R |
| 4,695,888 A | 9/1987 | Peterson | 358/213.13 |
| 4,695,891 A | 9/1987 | Peterson | 358/213.3 |
| 4,713,686 A | 12/1987 | Ozaki et al. | 385/107 |
| 4,858,934 A | 8/1989 | Ladick et al. | 273/186 A |
| 5,101,268 A | 3/1992 | Ohba | 358/88 |
| 5,111,410 A | 5/1992 | Nakayama et al. | 364/551.01 |
| 5,179,441 A | 1/1993 | Anderson et al. | 358/88 |
| 5,210,603 A | 5/1993 | Sabin | 358/93 |
| 5,297,796 A | 3/1994 | Peterson | 273/183.1 |
| 5,342,054 A | 8/1994 | Chang et al. | 273/186.1 |
| 5,471,383 A | 11/1995 | Gobush et al. | 364/410 |
| 5,501,463 A | 3/1996 | Gobush et al. | 273/184 R |
| 5,575,719 A | 11/1996 | Gobush et al. | 473/223 |
| 5,589,628 A | 12/1996 | Braly | 73/12.02 |
| 5,803,823 A | 9/1998 | Gobush et al. | 473/223 |
| 6,034,723 A | * 3/2000 | Fujimori | 348/208 |
| 6,241,622 B1 | * 6/2001 | Gobush | |

OTHER PUBLICATIONS

Pulnix Imaging Products Catalog, Pulnix Industrial Products Division, "TM–6705AN Progressive Scan Async Shutter & Readout Camera" (71–0022 Rev. A Printed Jun. 1999).

(List continued on next page.)

*Primary Examiner*—Mark Sager
(74) *Attorney, Agent, or Firm*—Swidler Berlin Shereff Friedman, LLP

(57) ABSTRACT

A launch monitor system including a light source and at least one camera unit with an electronic shutter. The camera unit captures at least one image of an object in flight when the electronic shutter is activated. A computer receives signals related to the image and computes launch conditions for the object. The system also computes and displays object trajectories from the computed launch conditions and a predetermined set of lift and drag parameters which account for the characteristics of the object and the atmospheric conditions.

42 Claims, 21 Drawing Sheets

OTHER PUBLICATIONS

Science and Golf II, 1$^{st}$ Edition, Jul. 1994, Gobush et al., "Video Monitoring System to Measure Initial Launch Characteristics of Golf Ball," Ch. 50, pp. 327–333.

Science and Golf, 1$^{st}$ Edition, Jul., 1990, Chiraraishi et al., "A new method on measurement of trajectories of a golf ball" pp. 193–198.

Science and Golf, 1$^{st}$ Edition, S. Aoyama, Jul. 1990,"A modern method for the measurement of aerodynamic lift and drag on golf balls," pp. 199–204.

Scientific American, Jan. 1997, Mion et al., "Tackling Turbulence with Supercomputers," pp. 62–68.

The Wall Street Journal, Nov. 1997, Bill Richards, "Why It Takes a Rocket Scientist to design a Golf Ball", pp. B1 and B11.

* cited by examiner

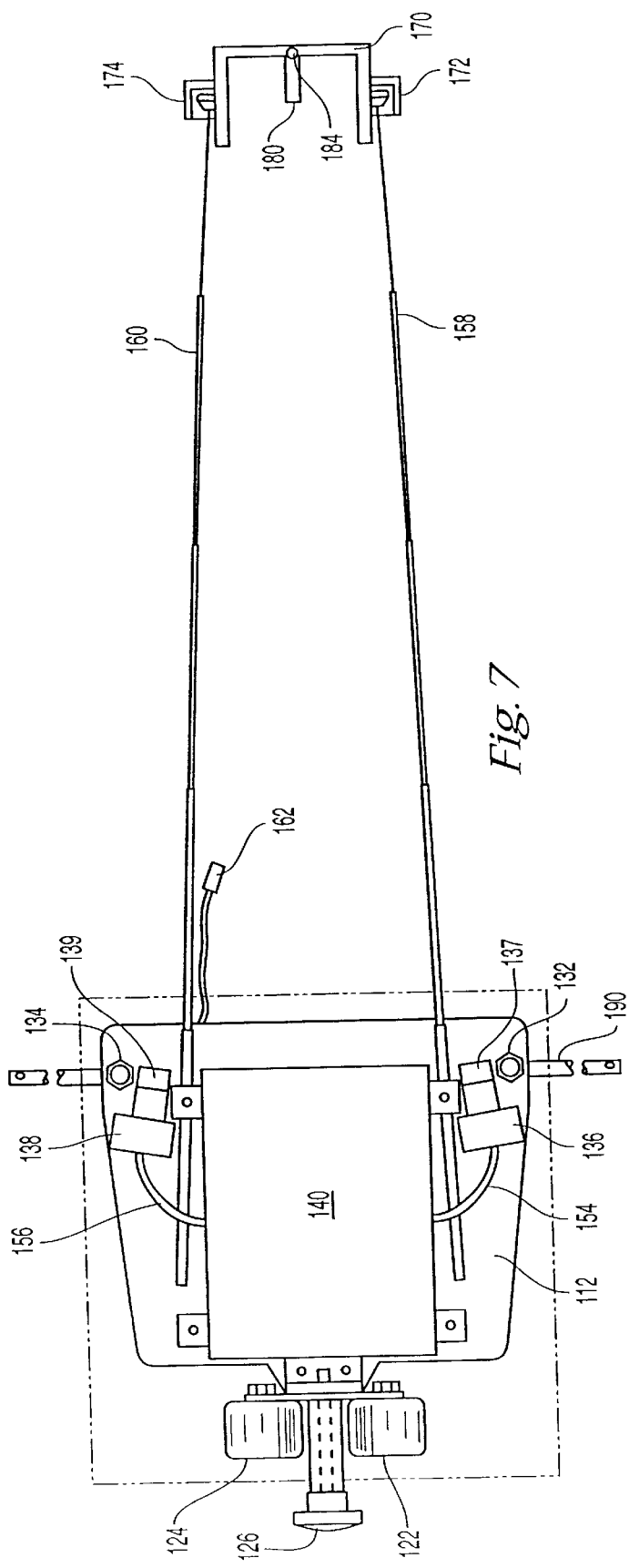
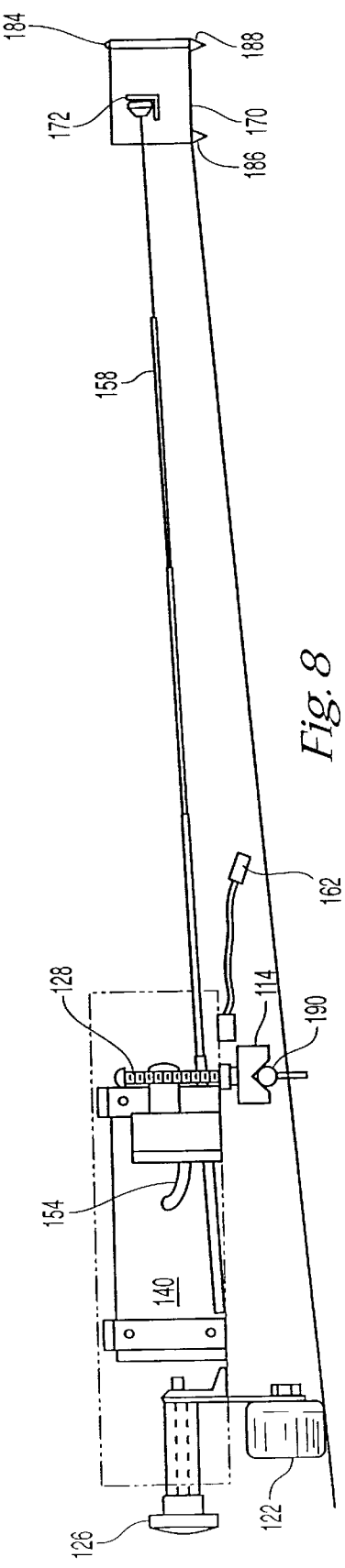
Fig. 7
Fig. 8

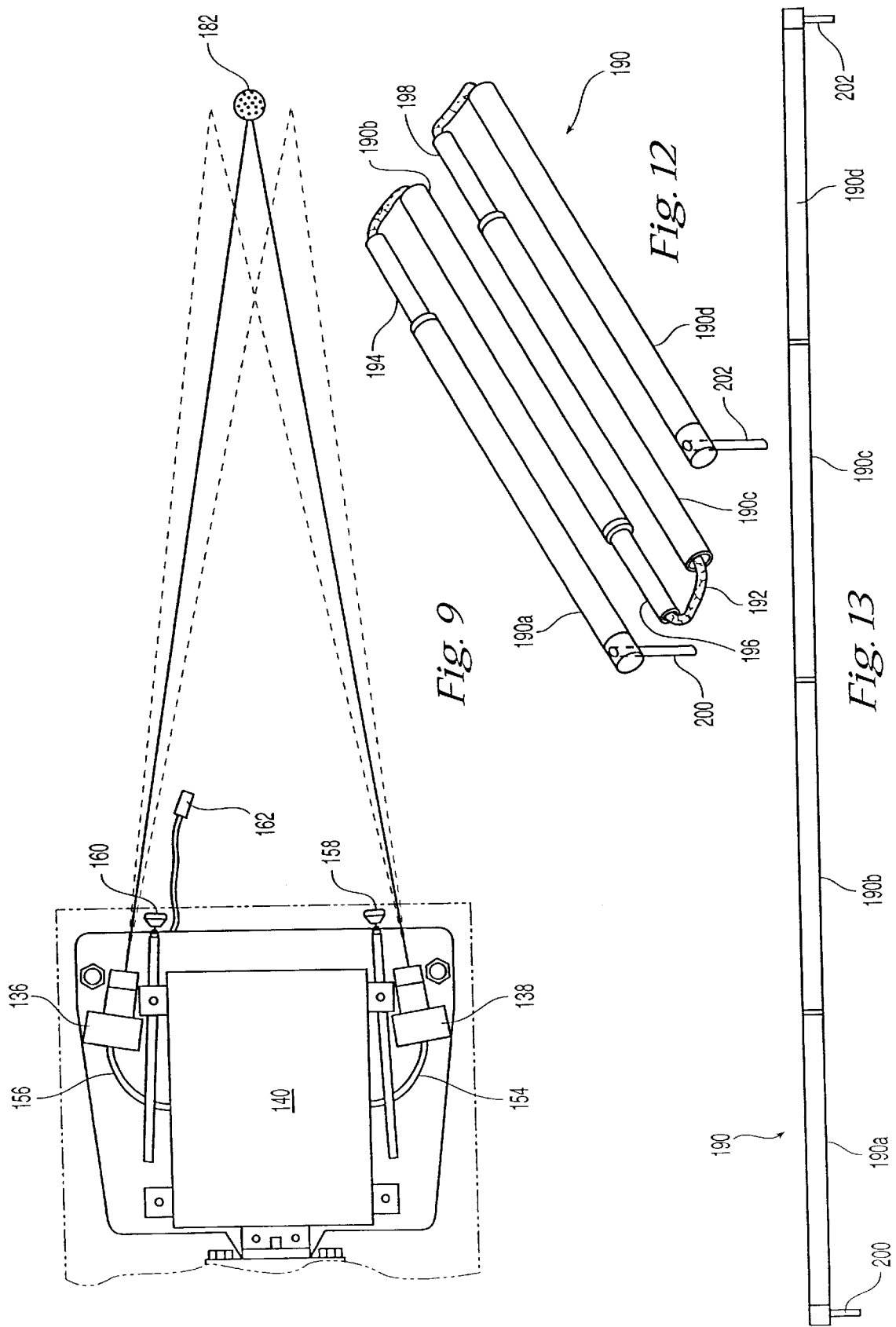

MULTISHUTTER CAMERA SYSTEM

CROSS-REFERENCE TO RELATED APPLICATIONS

This application is a continuation of U.S. patent application Ser. No. 09/156,611, filed Sep. 18, 1998, now U.S. Pat. No. 6,241,622, the entire disclosure of which is incorporated by reference herein.

TECHNICAL FIELD OF THE INVENTION

The present invention relates to a device that measures the launch conditions of an object. More particularly, the present invention is directed to a multi-shutter camera system for use with golf equipment. Further, the present invention is directed to a method of calculating the trajectory of an object based on the measured launch conditions.

BACKGROUND OF THE INVENTION

Apparatus for measuring golf ball launch conditions are known as disclosed in U.S. Pat. Nos. 4,063,259; 4,375,887; 4,158,853; and 4,136,387. Techniques of detecting golf club head position and golf ball position shortly after impact using photoelectric means to trigger a flash to permit a photograph to be taken of the club head have been disclosed (U.S. Pat. Nos. 4,063,259 and 4,375,887). Golf ball or golf club head movement has been determined by placing reflective areas on a golf ball and using electro-optical sensors (U.S. Pat. No. 4,136,387). The electro-optical sensing of light sources on both the golfer's body and club has also been disclosed in U.S. Pat. No. 4,137,566. In addition, apparatus for monitoring a golfer and the golf club being swung has also been disclosed (U.S. Pat. No. 4,137,566).

One particularly troublesome aspect of past systems for measuring golf ball launch conditions relates to their lack of portability. In this regard, prior systems have generally required cameras, sensors and strobe lights set up in various positions about the golfer. In addition, past systems have not had the ability to be utilized outdoors but have had to be set up indoors under less than ideal or realistic golfing conditions. As prior golf ball and/or golf club monitoring systems have not been portable and have not been capable of practical use outdoors, the systems have not been usable in the most desirable teaching or club fitting locations, e.g., on an outdoor driving range.

One additional area that has not been adequately addressed by past golf ball launch monitoring systems relates to the area of predicting flight path differences based on different physical characteristics of golf balls and/or different atmospheric conditions that a golfer may encounter after being tested by the launch monitor system. It would therefore be desirable to provide a system, which measures the launch or launch conditions of a golf ball having a particular construction, such as a two-piece construction, under ideal atmospheric conditions. Then provide the golfer with revised golf ball flight results based on computer predictions for golf balls having different physical characteristics (such as a three-piece golf ball) and different atmospheric conditions (such as higher elevations, higher humidity or more adverse wind conditions).

Other systems, even if portable, have required the use of a strobe light to take multiple images of the object on one frame. The strobe lights are used as shuttering means to freeze the object in a frame at several times. Also, at least three retro-reflective material markers are used on the object to provide reflection of light from the strobe light for the camera to take the images. The retro-reflective material markers, because of their thickness, may effect the results of the motion analysis for the golf ball. Furthermore, it is recommended that these markers are placed at precise locations on the object. This is labor intensive and difficult.

Therefore, an improved multi-shutter camera system is desired.

SUMMARY OF THE INVENTION

Broadly, the present invention comprises method and apparatus for measuring the speed, direction, spin and orientation of an object and from such data computing the launch conditions of the object.

In particular, the present invention contemplates a launch monitor system for measuring launch characteristics of a golf ball from data taken when the golf ball is in a predetermined field-of-view. The system preferably includes a light source and at least one camera unit having an electronic shutter. Unlike previous systems, the light source provides a source of light at least when the object is in the field-of-view. A strobe light is not needed to make an image as the electronic shutter replaces the strobe light. Further, because an electronic shutter and a non-flashing light source are used, retro-reflective material markers are not required.

In one embodiment, may include slide pads, wheels, or combinations of both. The support elements may be height-adjustable to vary the orientation and direction of view of the system and, specifically, the camera unit. As an additional aspect of the invention, a distance calibrator may be provided for calibrating the distance between the camera unit or units and the predetermined field-of-view.

Additionally, the present invention describes a method of calculating the trajectory of an object based on launch conditions measured while an object is moving in a predetermined field-of-view. Specifically, the method provides for taking at least one image of the object while it is in the field-of-view and calculating the launch conditions therefrom.

BRIEF DESCRIPTION OF THE DRAWINGS

Reference is made to a brief description of the drawings, which are intended to illustrate several embodiments of a multi-shutter camera system of the present invention.

FIGS. 7–7A are top views of the system shown in FIGS. 6–6A and generally showing calibration of the system;

FIG. 8 is a side elevational view of the system during calibration as shown in FIG. 7;

FIG. 9 is a top view of the system shown in FIGS. 6–8 and generally showing a golf ball in place under operating conditions;

FIG. 12 is an example of a rod of FIGS. 7–7A useful for allowing movement of the system, wherein the rod is unassembled;

FIG. 13 is an elevational view of the rod of FIG. 12 shown in an assembled condition;

DETAILED DESCRIPTION OF PREFERRED EMBODIMENTS OF THE INVENTION

Figure 1:
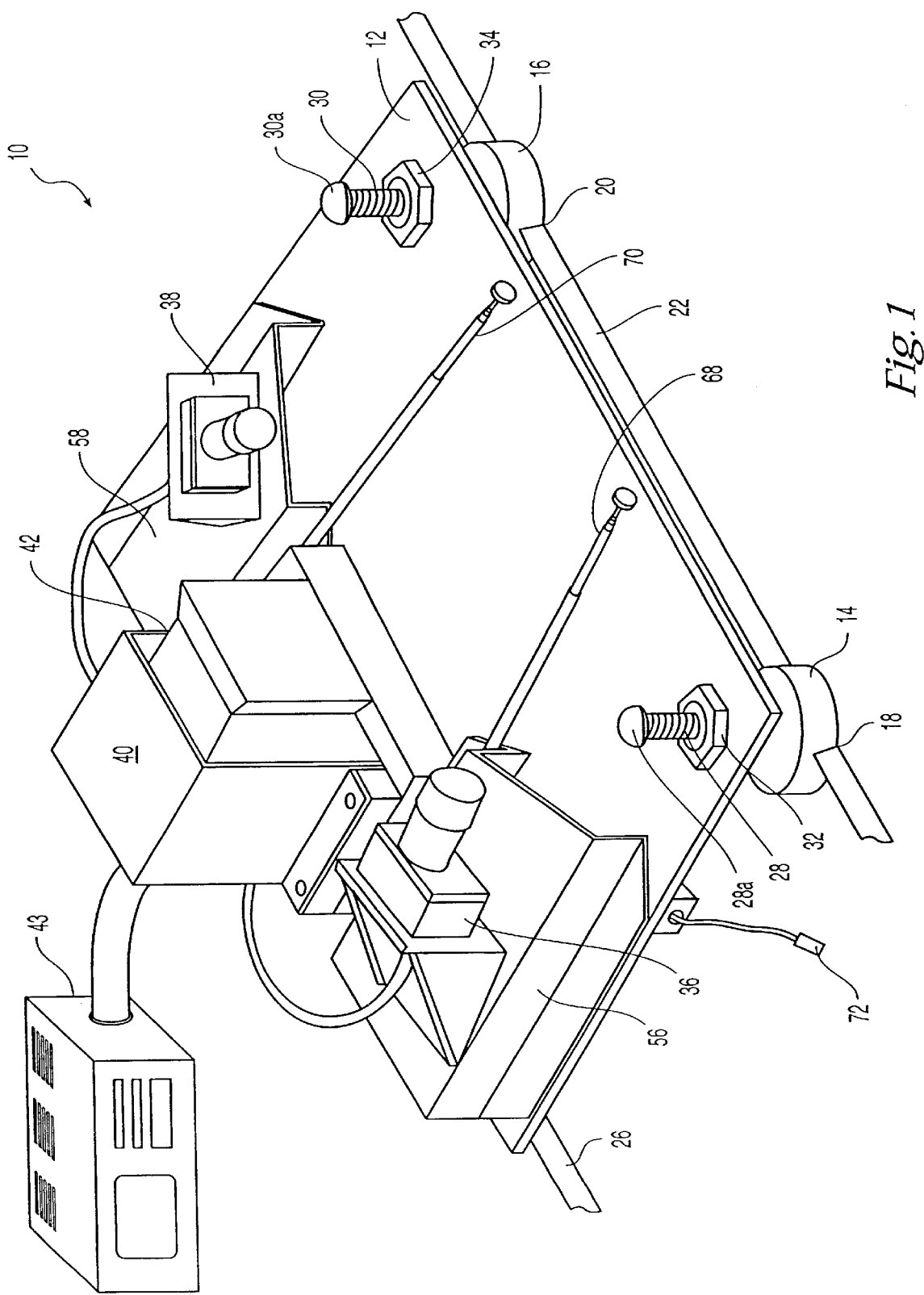
FIG. 1 is a perspective view of a first embodiment of a multi-shutter camera system the present invention.

FIG. 1 illustrates a preferred first embodiment of the invention in the form of a portable launch monitor system 10 including a base or support structure 12 and attached support elements 14, 16. Support elements 14, 16 are specifically shown as slide pads each including V-shaped notches 18, 20, which allow the pads 14, 16 to slide along a rod 22. Another slide pad 24 attached to the system 10 at the rear (shown in FIG. 3) similarly slides along a rod 26. One or more slide pads 14, 16, and 24 may be replaced by other support elements with different configurations or methods of moving, such as wheels. The term "slide pads" means any elements allowing the system 10 to slide or move back and forth relative to a predetermined field-of-view or parallel to a flight pattern of an object. Slide pads 14, 16 include a height adjustment feature allowing the front corners of system 10 to be raised or lowered for leveling purposes. Specifically, each slide pad 14, 16 is attached to support structure 12 by respective threaded rods 28, 30 and nuts 32, 34 fixed to the support structure 12. Rods 28, 30 each include a drive portion 28a, 30a that may be used to adjust pads 14, 16.

Referring now to FIGS. 1, 2–2A and 3, launch monitor system 10 further includes first and second camera units 36, 38, a centrally disposed control box 40, and a light source 42. First and second camera units 36, 38 are preferably Pulnix TM-6075AN cameras made by Pulnix America, Inc. in Sunnyvale, Calif. The Pulnix TM-6705AN camera is a square pixel, VGA format, black and white full frame shutter camera. The camera features an electronic shutter that allows the camera to take multiple shutter exposures within a frame to capture high speed events. The camera has a small, lightweight, rugged design, making it ideal for portable systems. Charge coupled device or CCD cameras are preferred. The angle between the two cameras' lines of sight is preferably in the range of about 10° to about 30°, with about 22° being most preferable. Each of the cameras 36, 38 also has a light-receiving aperture, and a light sensitive silicon panel 39 (see FIG. 4, showing the silicon panel, which also generally corresponds to an image captured by the cameras and used by the system). The cameras are directed and focused on a predetermined field-of-view through which a golf ball moves and is imaged. Preferably, the light source 42 is a DC source such that the light does not flicker. The light source can be any source of light, even the sun.

Figure 4:
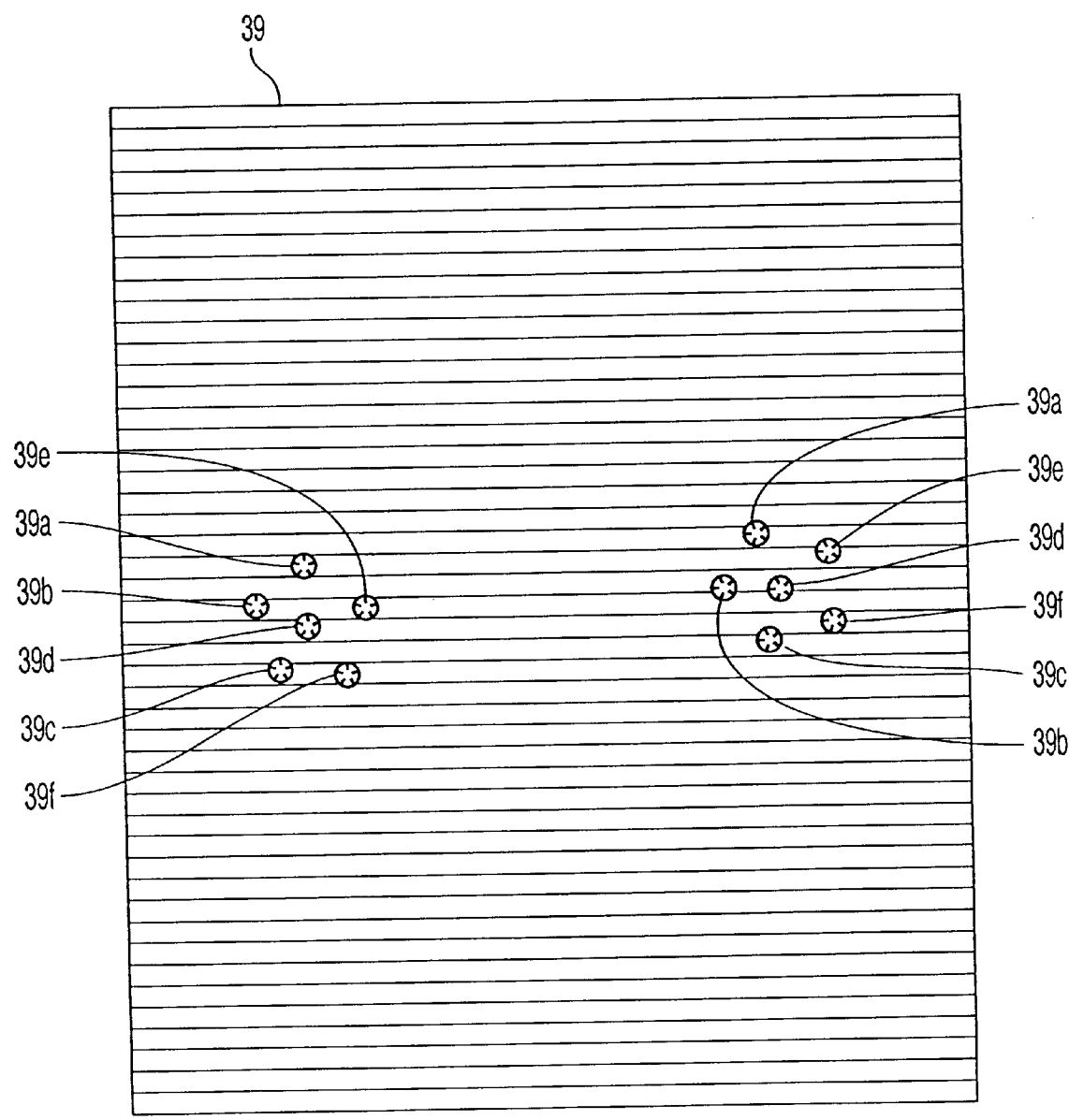
FIG. 4 is an elevational view of a light receiving and sensory grid panel located in each camera.
Figure 5:
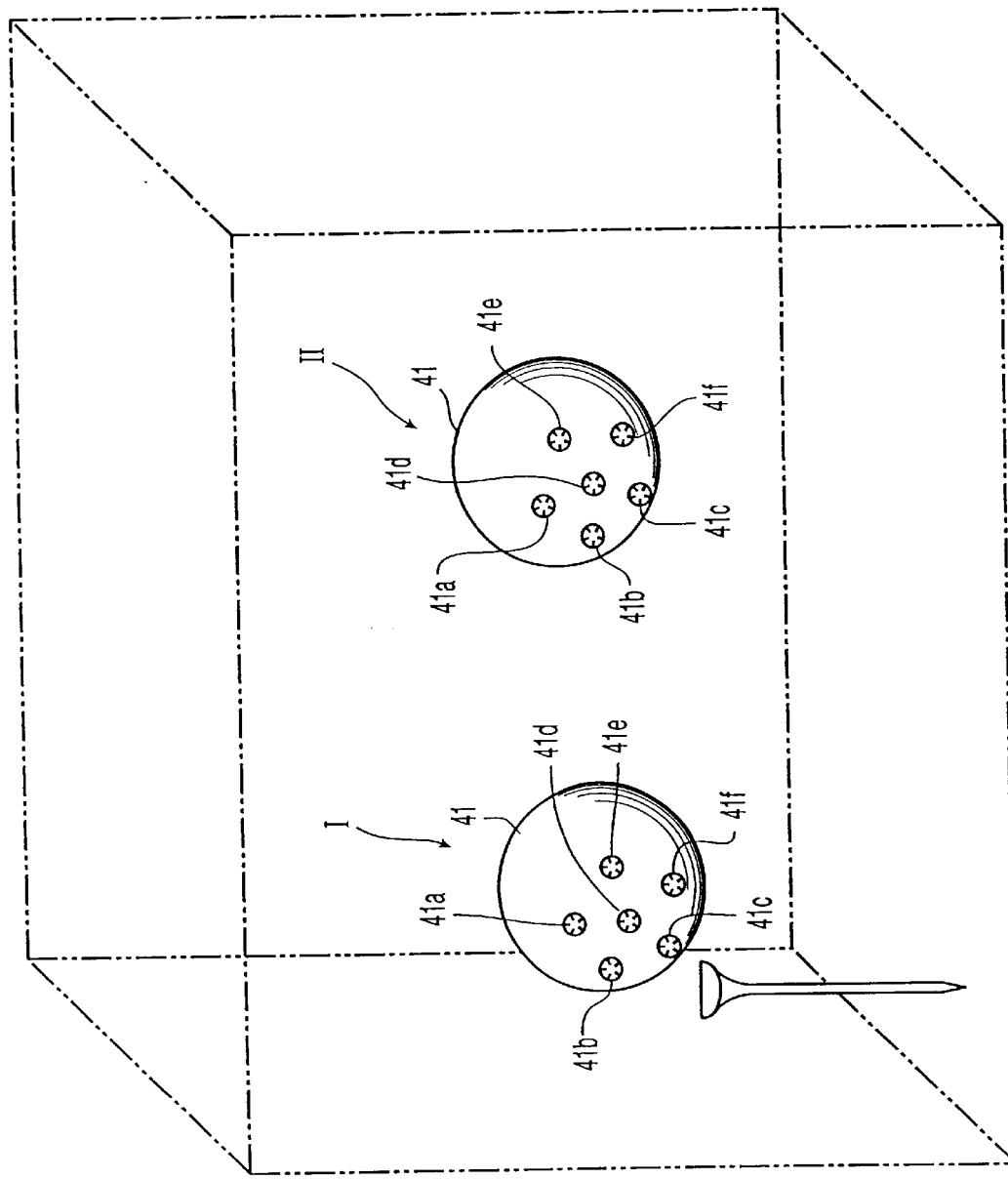
FIGS. 5–5B are perspective views of a three-dimensional rectilinear field showing various golf balls at two different positions I and II.

As shown in a three-dimensional, predetermined, rectilinear field-of-view (shown in phantom) in FIG. 5, golf ball 41 preferably has at least three (3) reflective, spaced-apart marks or dots 41a–f placed thereon. Golf ball 41 is shown in two positions I and II to illustrate the preferred embodiment, the positions correspond to the locations of the golf ball 41 when imaged by the system. In positions I and II, the golf ball is shown after being struck. The image taken at position I occurs at a first time and the image taken at position II at a second time. The preferred diameters of the round dots 41a–f range from one-tenth ($\frac{1}{10}$) to one-eighth ($\frac{1}{8}$) of an inch, but other sized and shaped areas can be used. Because an electronic shutter is used, the panel 39 (as shown in FIG. 4) is exposed for a significantly shorter time than when a mechanical shutter is used. Thus, the retro-reflective material markers used with strobe light sources are unnecessary.

Figure 2:
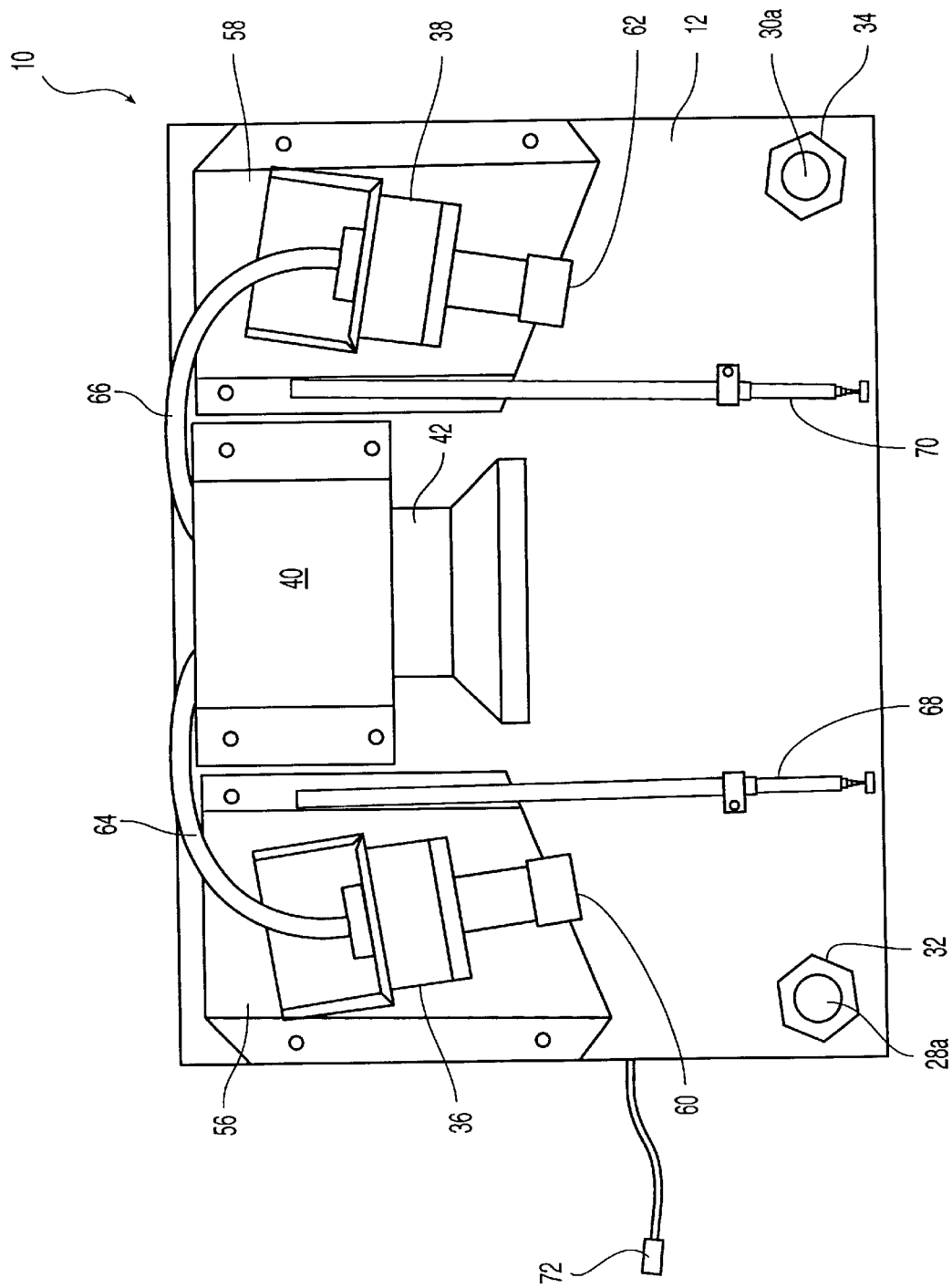
FIG. 2 is a top view thereof.
Figure 2A:
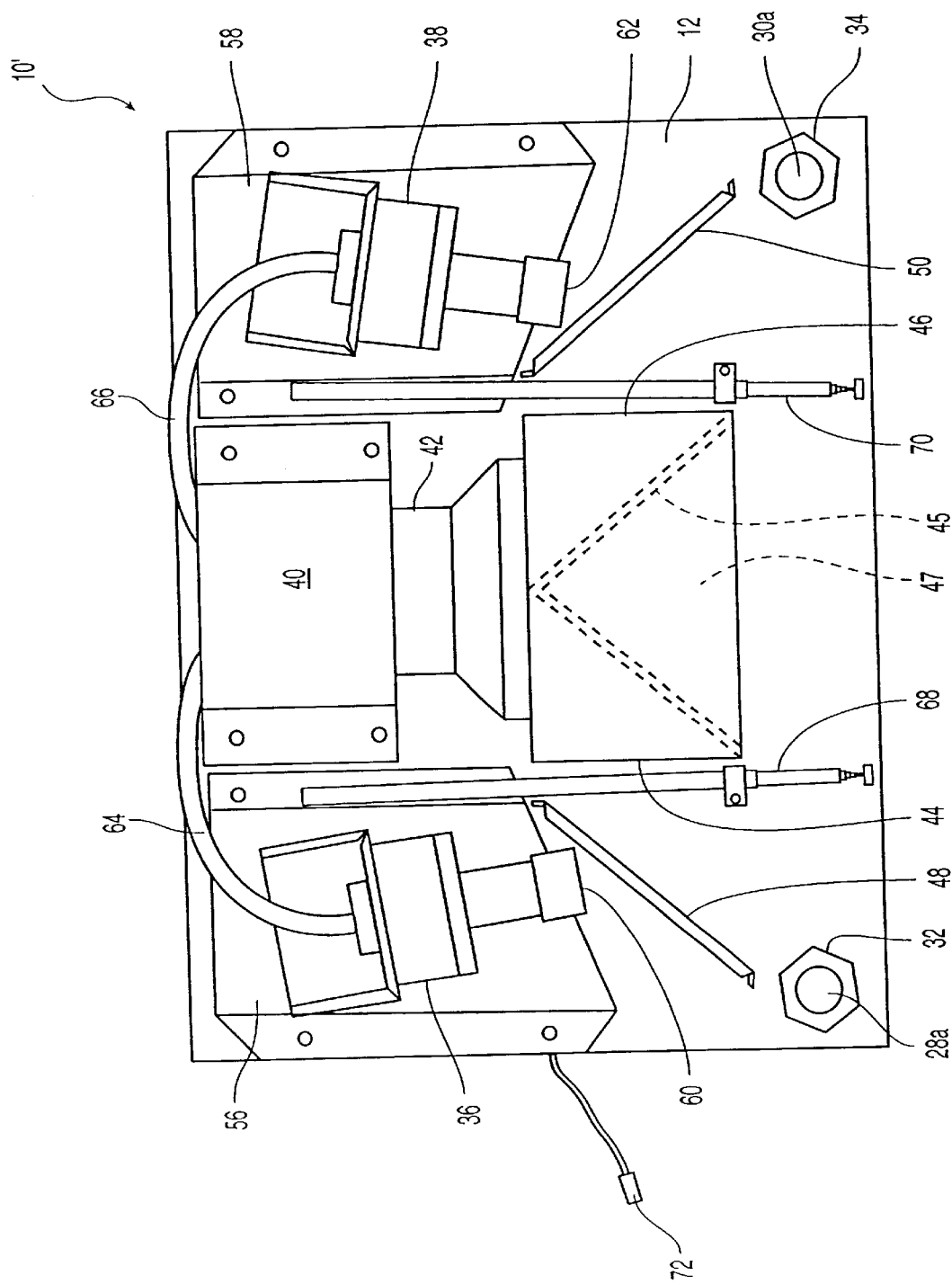
FIG. 2A is a top view of a variation of the first embodiment.

Dots 41a–f are preferably invisible fluorescent markers that are pad printed or painted on the ball. An interference filter on the camera is preferable, when using marks that fluoresce. The interference filter filters the desired range of light as known by those of ordinary skill in the art. Infrared markings that reflect when irradiated with the proper wavelength source of light can also be used. Colored markers such as red, green or blue can be used on the golf ball. When using colored markers, an interference filter is used on the camera to provide a stronger contrast for the color chosen. Of these colors, red is the most preferred as a CCD camera provides a greater contrast with this color. Retro-reflective markers made with glass beads can also be painted on the golf ball. As described below, reflective panels 48, 50 (as shown in FIG. 2A) are required when using painted retro-reflective markers.

The number of dots or areas may be as few as three (3) and up to six (6) or more for the golf ball, provided each dot or area reflects light from the golf ball in both positions shown in FIG. 5. Preferably, there are six dots on the golf ball. Referring to FIGS. 1–3 and 5, as a result of the positioning of the cameras 36, 38 and the dots 41a–f, both cameras 36 and 38 are capable of receiving light when the shutter is activated. The light received is reflected by dots 41a–f, which appear as bright areas 39a–f on the silicon panel 39 (as shown in FIG. 4) and the corresponding image. Alternatively, the dots may be non-reflective, appearing as dark areas on the silicon panel.

Reflective materials as compared with the coated surface of the golf ball can be as high as nine hundred (900) times brighter where the divergence angle between the beam of light striking the dots 41a–f and the beam of light from such dots to the camera aperture is zero or close to zero. As the divergence angle increases, the ratio of brightness of such dots 41a–f to the background decreases. Also, electromagnetic waves outside the range of visible light, such as infrared light, may be used in the light source 42 to make the light source 42 invisible to the golfer.

Referring to FIG. 1, the control box 40 communicates via an asynchronous protocol to the camera units 36, 38 to control their activation to take a picture of the ball several times by use of its multishuttering electronics. Preferably, a 586 Intel based processor with a PCI slot for installation of a MV1000 PCI Bus Frame Grabber, made by MuTech Corporation in Billerica, Massachusetts, is used. The frame grabber is linked to the Pulnix TM-6705AN cameras for directing each camera to take pictures. As shown in FIG. 2, the light source 42 is preferably located between the two cameras 36, 38 such that the light source is perpendicular to the flight path of the object. The light source is constant rather than a strobe-type source. Cameras 36, 38 are fixed on support structure 56, 58 and are thereby disposed with their respective lenses 60, 62 directed to the predetermined field-of-view. Video lines 64, 66 feed the video signals into control box 40 for subsequent use.

Referring to FIG. 2A, an alternative variation of the first embodiment of the system 10' is shown. The system 10' has been modified to include a box 47 that has windows 44, 46 and a beam splitter 45 (shown in phantom). The system 10' is for use if printed retro-reflective markers are used on the golf ball. When these markers are used, the beam splitter 45 and reflector panels 48, 50 are needed. The light source 42 is preferably located between the two cameras 36, 38. The light source 42 is constant rather than a strobe-type source. The locations of the light source 42, beam splitter 45, reflective elements 48, 50 and cameras 36, 38 allow the light directed from the light source 42 to enter the field-of-view and be reflected back from the ball, due to the reflective dots, to the camera lenses 60, 62.

Figure 2B:
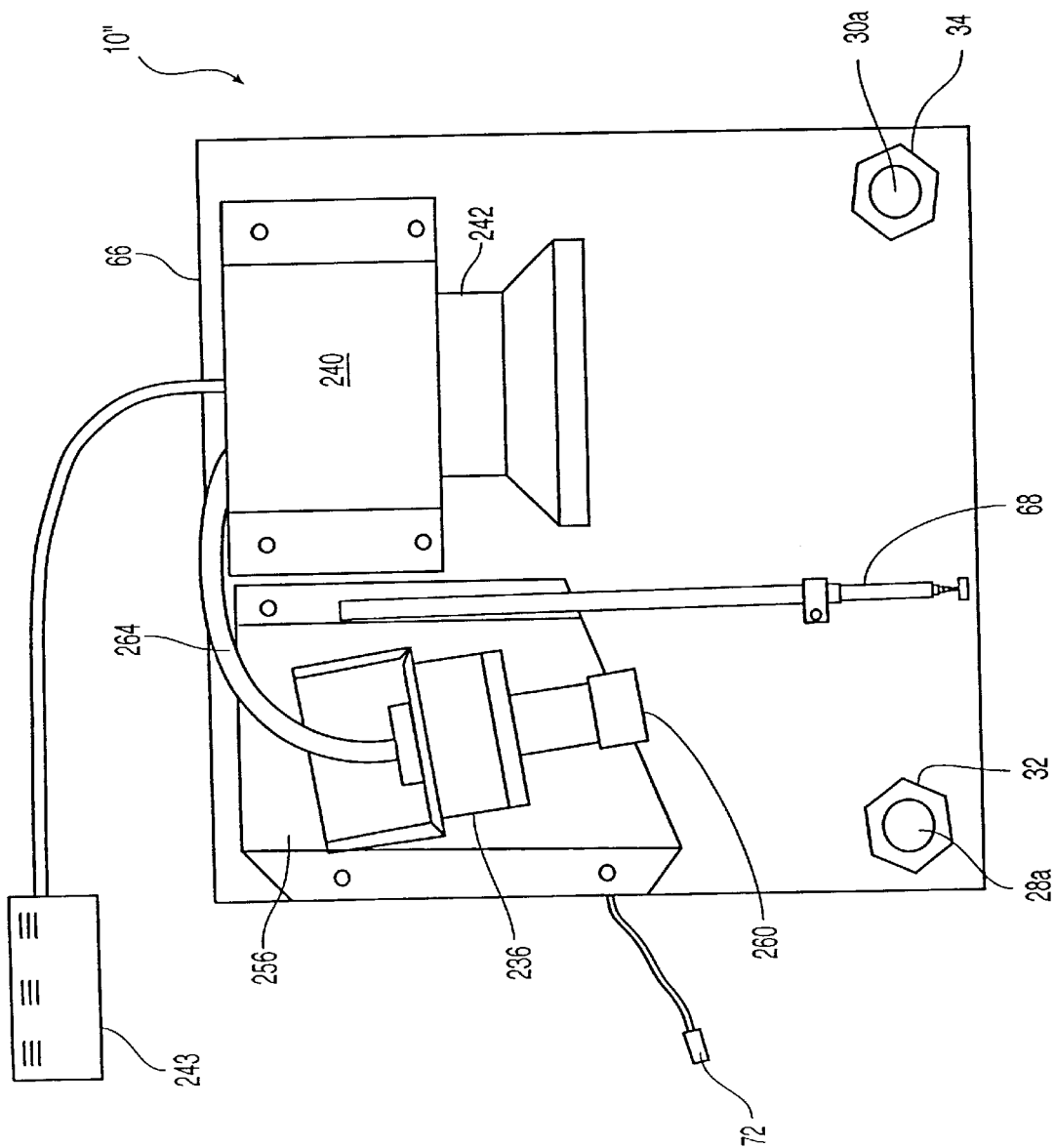
FIG. 2B is a top view of another variation of the first embodiment.
Figure 5A:
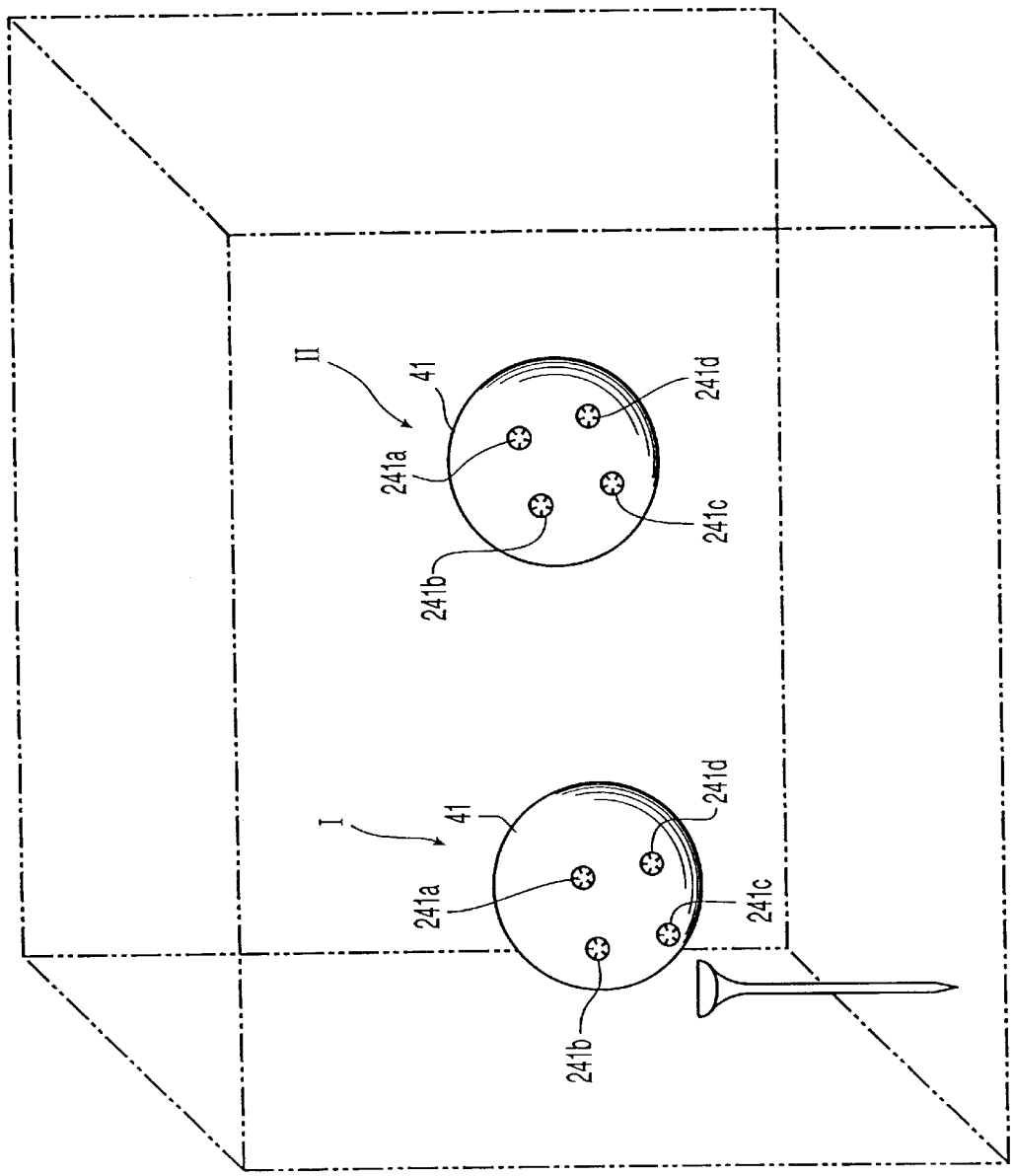
Figure 5B:
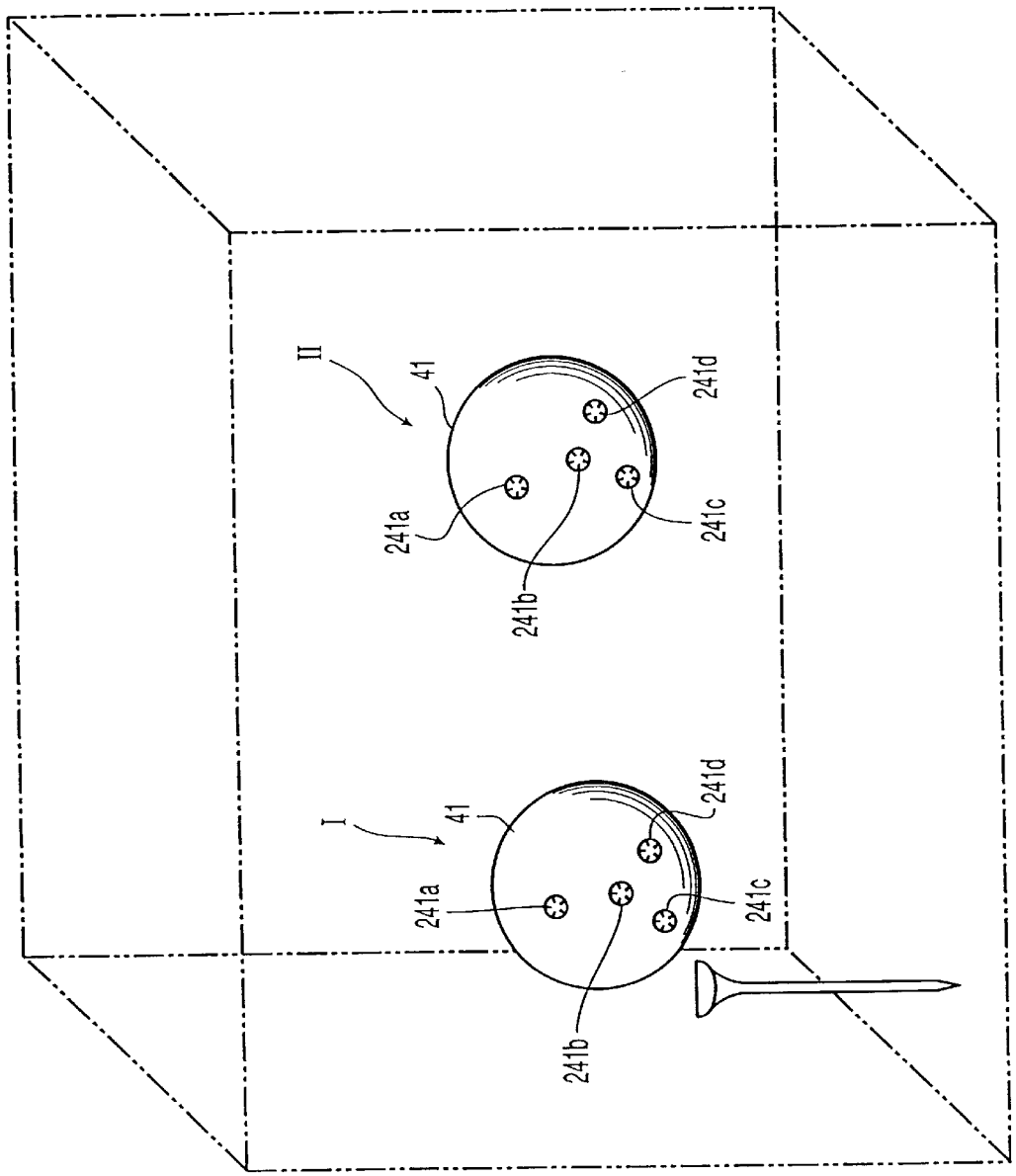

Referring to FIG. 2B, an alternative variation of the first embodiment of the launch monitor system 10" is shown. The system 10" has been modified to include a single camera unit 236, an adjacent centrally disposed control box 240, and a light source 242. The camera is preferably a Pulnix TM-6075AN camera as described above. The camera is directed and focused on a predetermined field-of-view in which an object moves and is imaged. The light source 242 is on when the object is in the field-of-view. Preferably, four or more markers are used on the golf ball in the system 10" using one camera 236. The dots 241a–d may be placed as shown on the ball 41 in FIGS. 5A and 5B, which show the reflective markers 241a–d on the golf ball 41 in a three-dimensional predetermined rectilinear field-of-view (shown in phantom). Preferably, fluorescent markers are used. Similarly to the two-camera system, if retro-reflective painted markers are used on the golf ball, the light source can direct light through a window to light reflecting elements or panels using a beam splitter as discussed above.

As shown in FIG. 2B, the camera 236 is fixed on a support structure 256 and is disposed with its lens 260 directed to the predetermined field-of-view. The system functions in a similar manner to the two-camera embodiment. The control box 240 communicates via an asynchronous protocol to the camera 236. In this manner, the actuation of the camera 236 is controlled and the multi-shutting electronics are used to take a picture of the object several times. Video line 264 feeds the video signal to the control box 240 for subsequent use. Thus, the single camera monitors an object's launch conditions. This embodiment can be further modified or expanded, as described below, in regard to the first embodiment having two cameras.

Referring to FIG. 2, preferably, telescoping distance calibrators or members 68, 70 are affixed to support structure 12. The distance calibrators are used in calibrating launch monitor system 10 at the appropriate distance from an object to be monitored. Distance calibrators 68, 70 are extendable members, for example, conventional radio antennae can be used. Calibrators 68, 70 are used in conjunction with a calibration fixture 170 (shown in FIG. 11) and discussed in detail below with respect to the second embodiment. It will be understood that the same calibration fixture is preferably used with both the first and second embodiments. It is recommended to use at least one distance calibrator.

In the first embodiment, a microphone 72 is used to begin the operation of the system 10. Preferably, a second trigger circuit can a synchronously trigger the cameras 36 and 38 to take a picture of the ball at several times by use of the camera's multishuttering electronics. When the golf club hits the golf ball, a first image of the golf ball 41 in the predetermined field-of-view is taken, as shown in FIG. 5, at position I, in response to the sound being transmitted by the microphone 72 to the system 10. The first of the two images needs only to be taken once the golf ball is struck by the club, as illustrated by the golf ball in position I of FIG. 5. The system 10 is preferably used to monitor only the golf ball, although it could also be used to monitor the golf club.

A laser or other apparatus can also be used to initiate the system. For example, the initiator can include a light beam and a sensor. When the moving golf ball passes through the light beam, the sensor sends a signal to the system. When the laser is used, the laser is arranged such that a golf club breaks the laser beam just after (or at the time) of contact with the golf ball. That is, the laser is aligned directly in front of the teed golf ball and the first image is taken as or shortly after the golf ball leaves the tee. The operation of the first embodiment is discussed in detail below after a description of the second embodiment.

FIGS. 6–10 illustrate a second embodiment of the system 100 that allows the second embodiment to be smaller than the first embodiment of the system. Launch monitor system 100 includes a base or support structure 112 that may also have a cover 113 (shown in phantom). Slide members or pads 114, 116 are utilized at a lower front portion of support structure 112 and include notches 118, 120 for receiving a rod 190 along which pads 114, 116 may slide.

Figure 3:
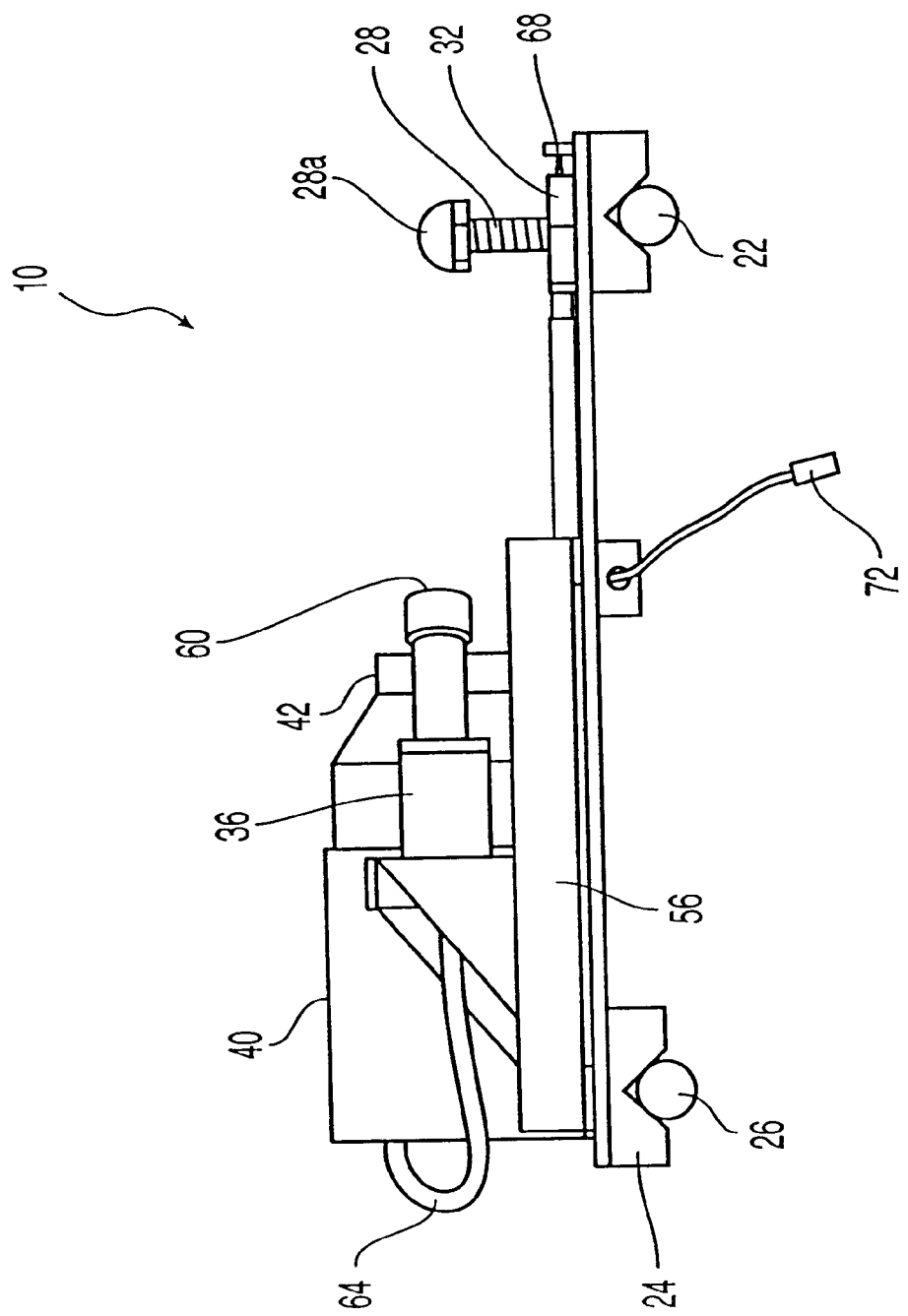
FIG. 3 is a side elevational view of the system shown in FIGS. 1 and 2.

As shown in FIGS. 7–8, wheels 122, 124 replace the pad 24 disclosed with respect to the first embodiment shown in FIGS. 1–3. Wheels 122, 124 are attached for rotation and to support structure 112 and includes a handle 126 for allowing an operator to move launch monitor system 100 back and forth along the ground.

Like the first embodiment, the second embodiment of system 100 also includes threaded rods 128, 130 and respective nuts 132, 134 for allowing height adjustment at the front of launch monitor system 100. The wheels may also be height adjusted relative to the support 112 to allow the system 100 to be adjusted depending on the terrain on which the system is placed. Although not shown for the second embodiment, the system 100 also has a computer and monitor 43 (as shown in FIG. 1) electronically connected thereto. The computer and monitor may be combined into a single element or be separate elements. The computer has several algorithms and programs used by the system 100 to make the determinations discussed below.

Figure 6:
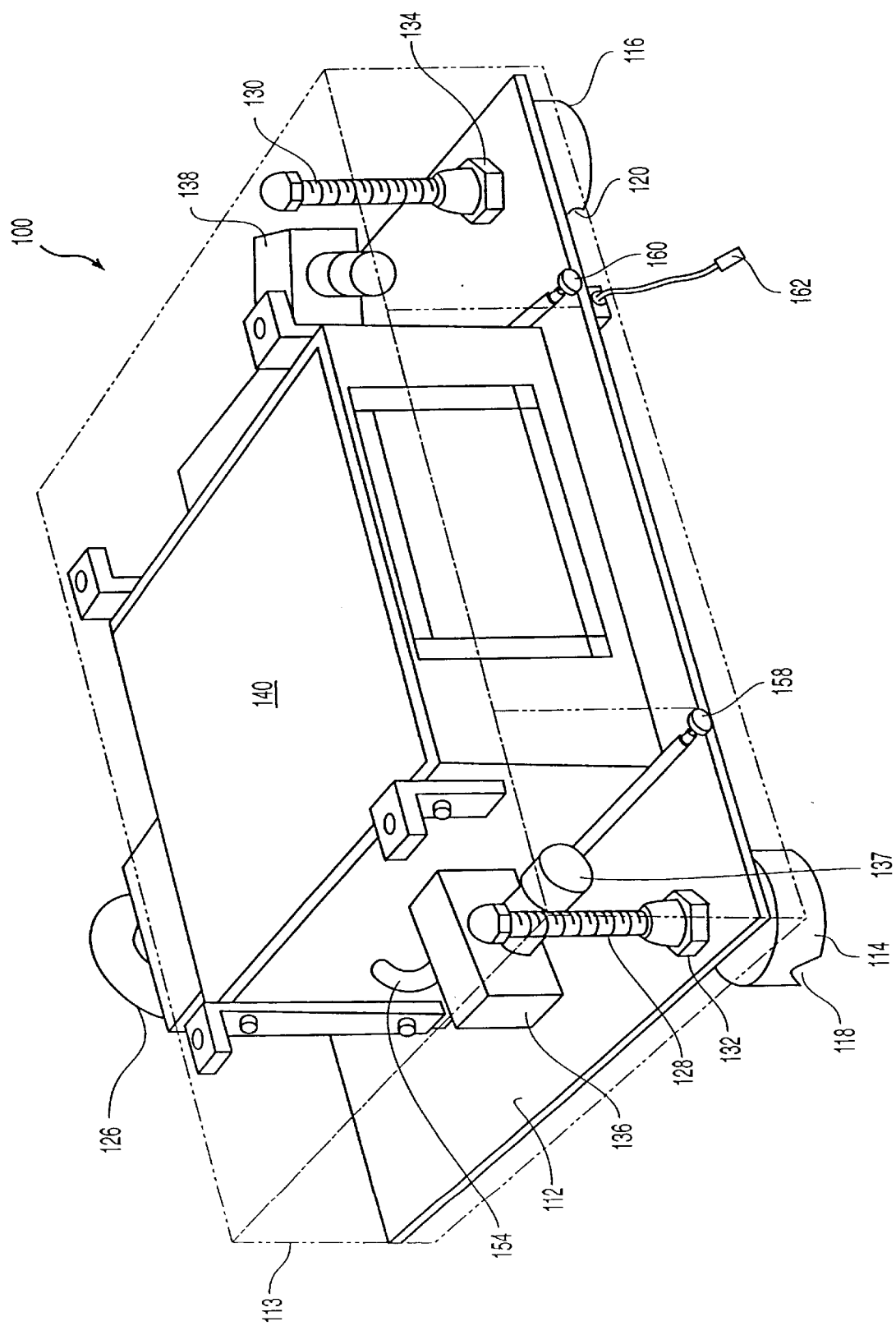
FIGS. 6–6A are perspective views of two variations of a second embodiment of the present invention.

As further shown in FIGS. 6 and 7, first and second camera units 136, 138 are affixed to support structure 112. The cameras also have light-sensitive silicon panels as in the first embodiment. The cameras 136, 138 each have a line-of-sight, which are illustrated as solid lines in FIG. 9, that are directed to and focused on the predetermined field-of-view. As illustrated in FIG. 9 with the broken lines, the cameras' fields-of-view are larger than are necessary to image just a single golf ball 182. Thus, the predetermined field-of-view is the cameras' fields-of-view at the location where the cameras' lines-of-sight intersect.

Figure 10:
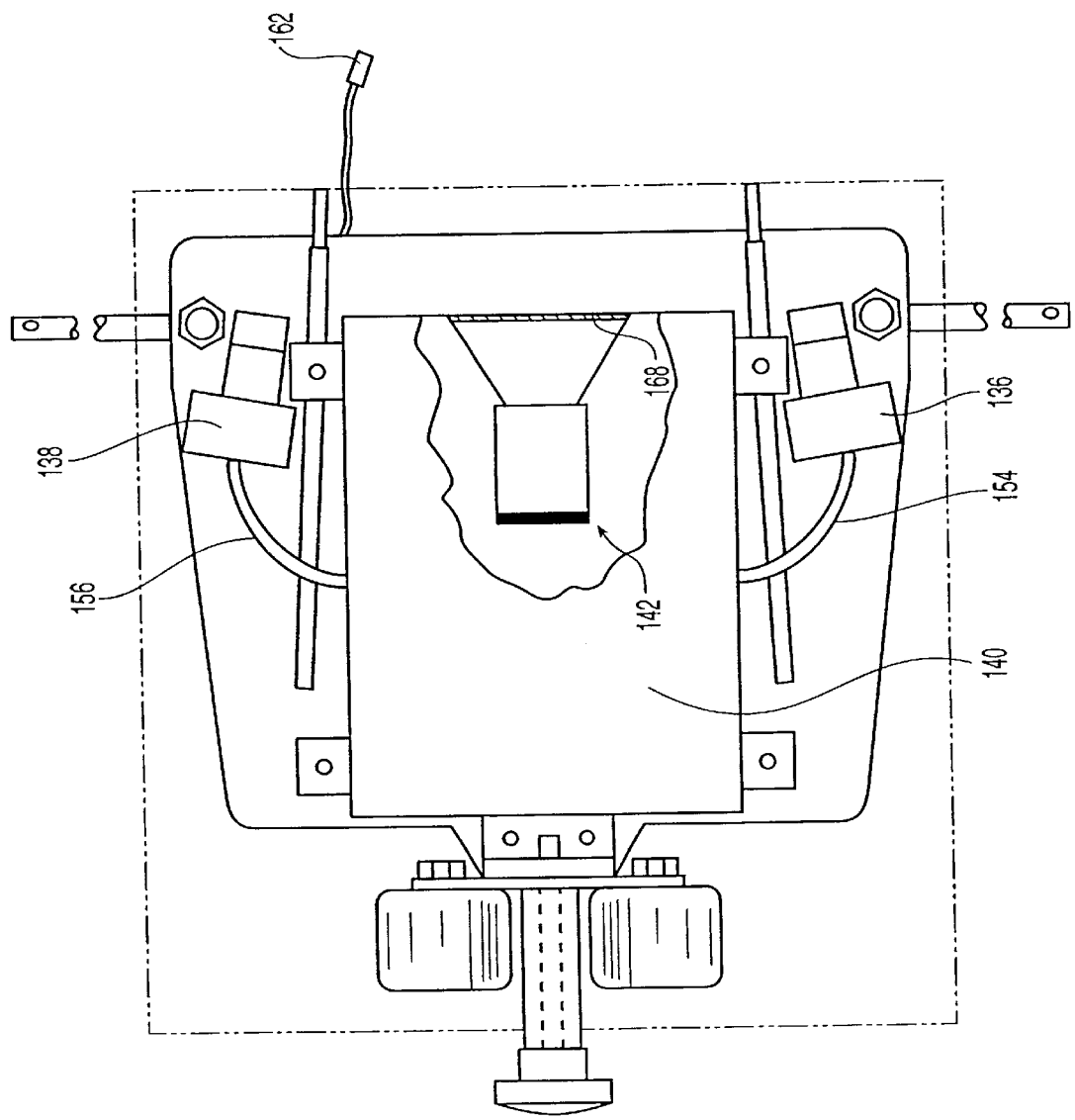
FIG. 10 is a partial, cut-away top view of the system shown in FIGS. 6–9.

As shown in FIG. 10, a control box 140 is provided and includes a light source 142 at a front portion thereof. The light source 142 is on when the object is in the field-of-view and may be infrared or a different wavelength depending on the type of markers used on the golf ball. As shown, the light source 142 is preferably located between the two cameras 136, 138.

Figure 6A:
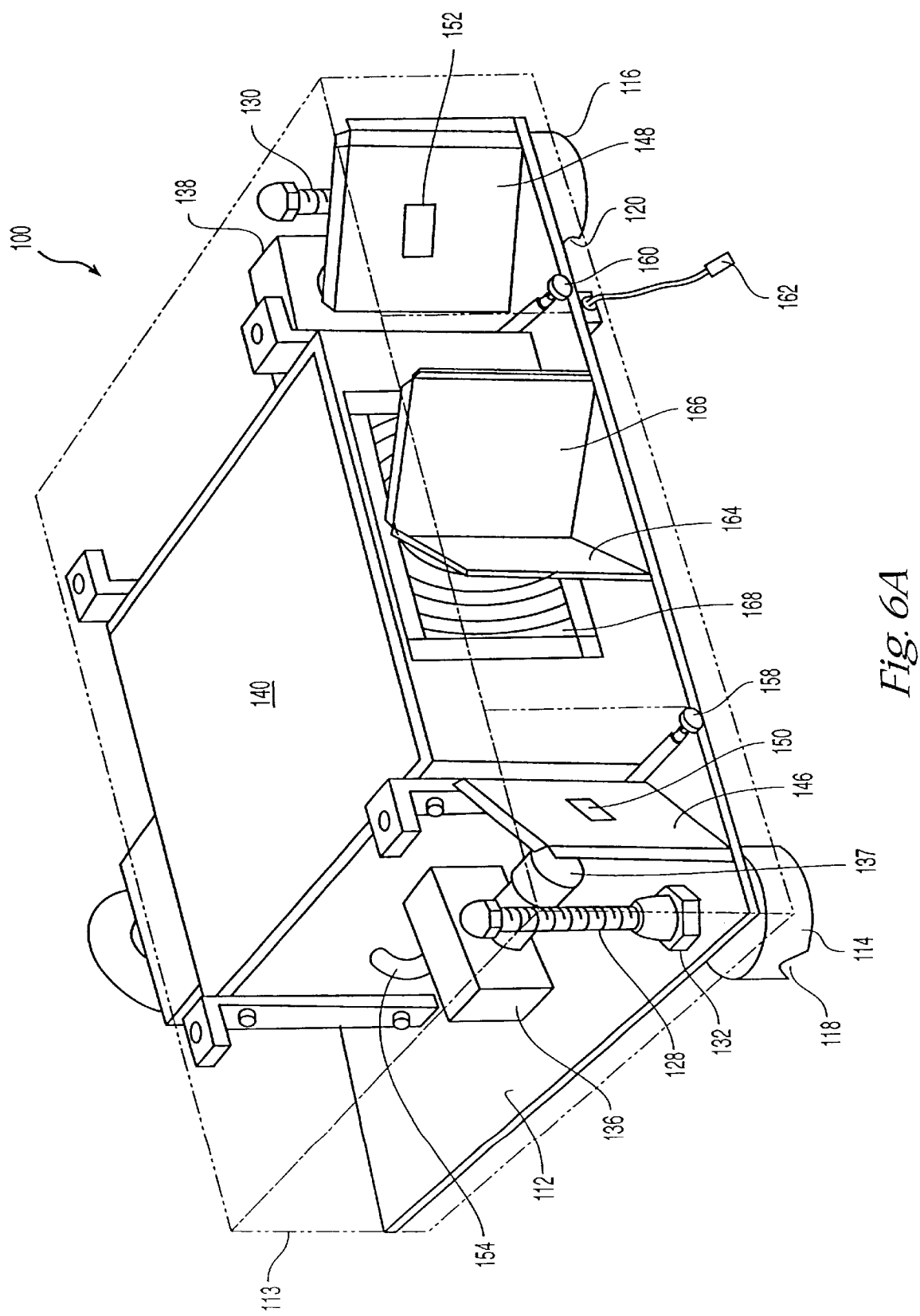
Figure 7A:
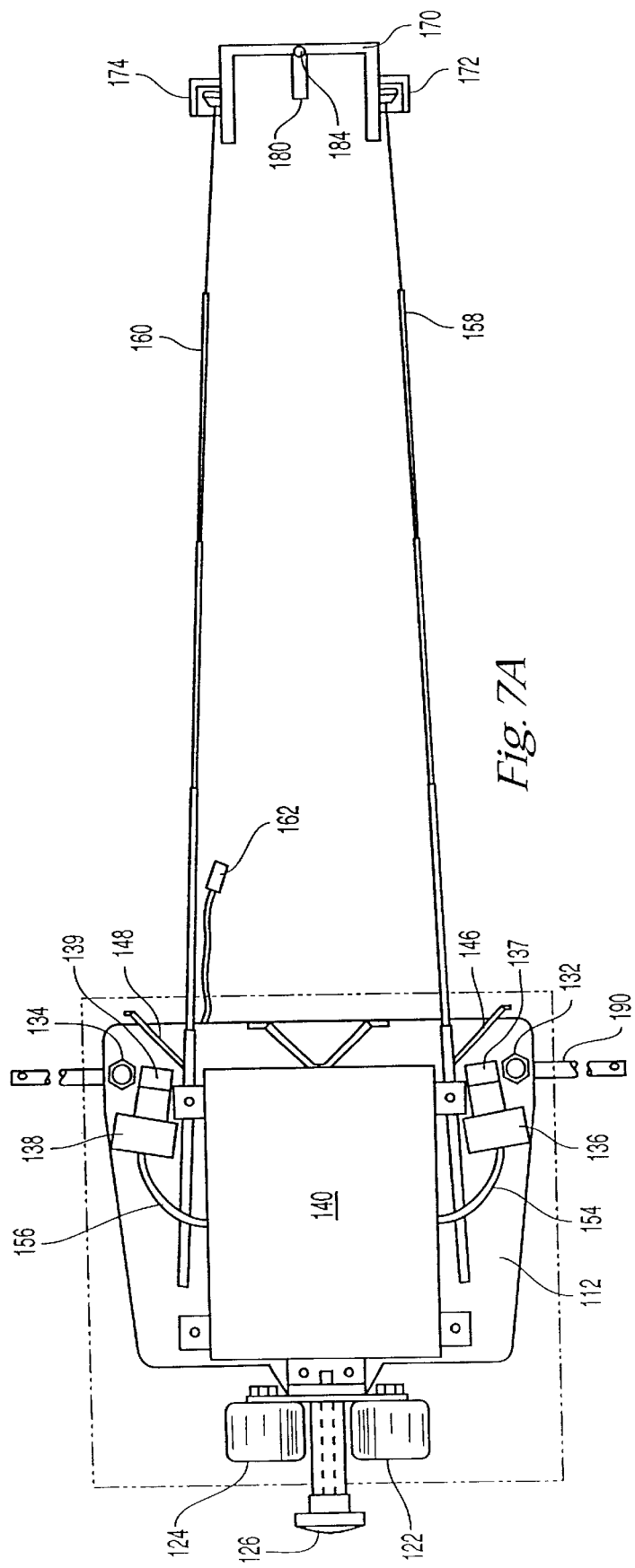

Referring to FIG. 6A, if painted retro-reflective markers are used, then, the reflective elements or panels 146, 148 are mounted to support structure 112 in a similar orientation to that discussed above with respect to the first embodiment. Referring to FIGS. 6A and 7A, reflective panels 146, 148 define respective apertures 150, 152. Cameras 136, 138 are mounted such that the lenses 137, 139 are directed through the respective apertures 150, 152 in the reflective panels 146, 148 to the predetermined field-of-view. Referring to FIG. 6A, a third light-reflecting panel 164 reflects one-half the light from the light source into the panel 146. A fourth light-reflecting panel 166 reflects the other half of the light into light reflecting panel 148. To increase the amount of light directed to the reflective elements or panels 146, 148, 164 and 166, the system 100 can use an optical or Fresnel lens 168 as disclosed in another commonly assigned application (application Ser. No. 09/156,611, filed Sep. 18, 1998).

As shown in FIGS. 7–7A, video lines 154, 156 from the respective electro-optical units 136, 138 lead to control box 140. Like the first embodiment, system 100 includes distance calibrators also in the form of antenna 158, 160, and a microphone 162 that also is used to initiate the operation of the system. Again, a laser or other method of initiating the system could be used. The respective set-ups for both the calibration mode and the operation mode of system 100 are shown in FIGS. 7–8 and 9, respectively. The distance calibrators extend to the intersection of the line of sight of the camera units or the field-of-view.

Figure 11:
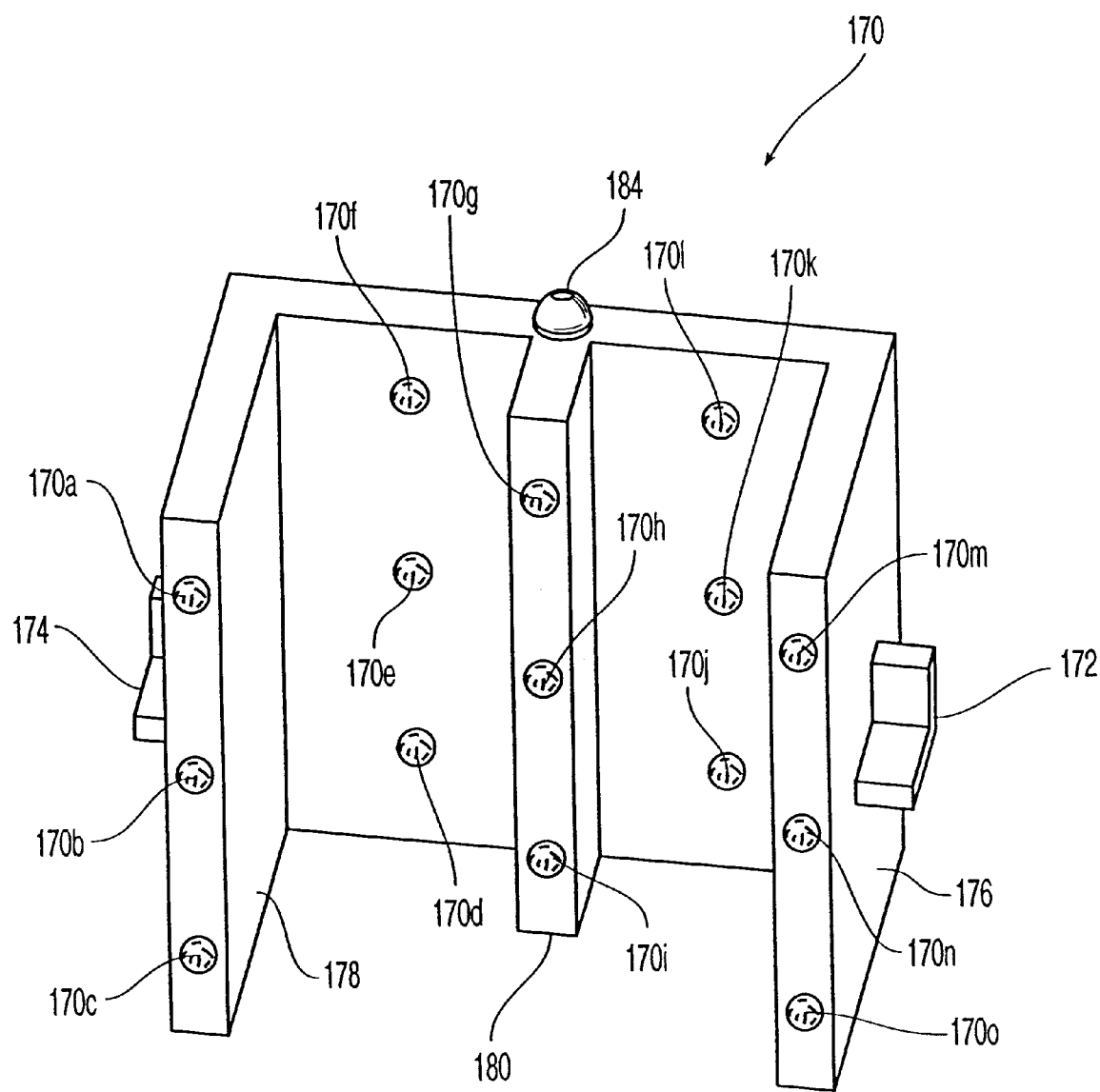
FIG. 11 is a perspective view of a calibration fixture carrying fifteen illuminated areas.

As shown in FIG. 11, and in use with the system in FIGS. 7–8, a calibration fixture 170 is provided to calibrate the system 100. Although this discussion is with reference to system 100, it applies equally to the first embodiment systems 10, 10' and 10". The fixture 170 includes receiving elements or tabs 172, 174 extending outwardly from outer legs 176, 178 for receiving an end portion of the distance calibrators 158, 160 (as shown in FIG. 6). When positioned at this location in accordance with the distance calibrators 158, 160, a central leg 180 of fixture 170 is disposed at the proper location for a golf ball 182 used in a launch monitoring operation, as shown in FIG. 9. Golf ball 182 also has the pattern of reflective dots 41a–f as golf ball 41 (as shown in FIG. 5) in the first embodiment.

Calibration fixture 170 further includes an optical level indicator 184 on a top surface thereof for allowing fixture 170 to be leveled before the calibration procedure. Finally, spikes 186, 188 (as shown in FIG. 8) extending from the bottom of fixture 170 are inserted into the turf to stabilize fixture 170 during the calibration procedure.

Fixture 170 has a pattern of reflective dots 170a–o, as shown in FIG. 11. Fifteen (15) dots are recommended. Since the horizontal movement of the golf ball is greater than its vertical movement during the time between the two images (see, e.g., FIG. 4), the calibration of the system need not cover as much distance in the vertical direction. Therefore, fewer dots in the vertical direction on the calibration fixture are needed to adequately calibrate the system. It is recommended that the dots are placed about one inch apart, and on three separate X planes that are 1.5 inches apart.

As shown in FIGS. 12 and 13, rod 190 (which may also be the same as rod 22 for system 10) may be easily disassembled for transport and reassembled on site before operation of any of the disclosed launch monitor systems. Specifically, rod 190 may comprise a plurality of sections 190a–d. Preferably, each of these sections comprises a hollow tube containing a single elastic cord 192 affixed at opposite ends of rod 190. Cord 192 has a relaxed length less than the total length of rod 190 in order to hold sections 190a–d together. Sections 190a, 190b, 190c have respective reduced diameter portions 194, 196, 198 that fit within respective ends of sections 190b, 190c, 190d. Pins 200, 202 are provided at opposite ends of rod 190 to allow the rod 190 to be secured into the turf.

Figure 14:
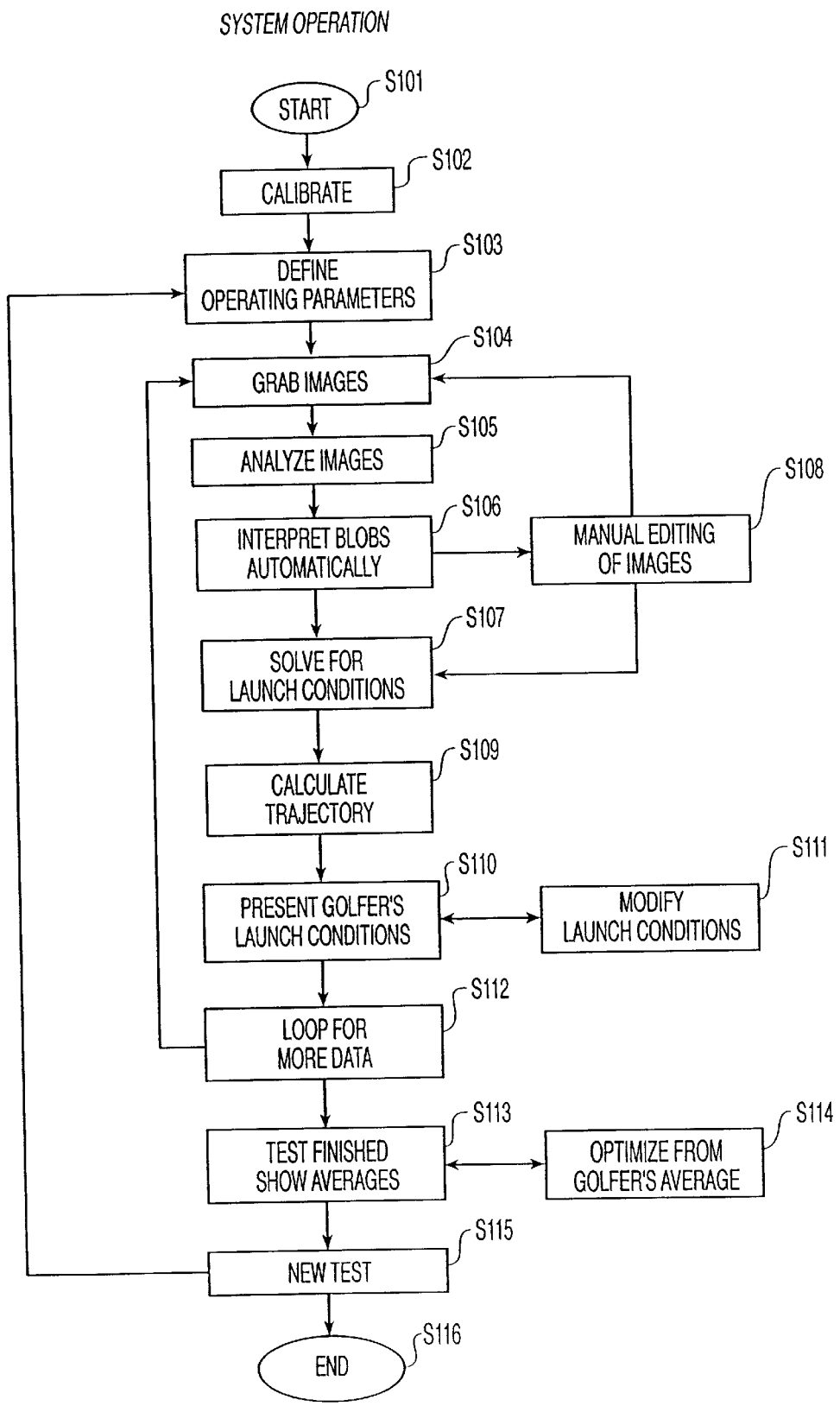
FIG. 14 is a flow chart describing operation of the system.

The use of both systems 10 and 100 is shown generally in FIG. 14.

At step S101, the system starts and determines if this is the first time the system has been used. By default, the system uses the last calibration when it is first activated. Therefore, it is preferred to calibrate the system each time it is moved and/or turned on.

At step S102, the system is calibrated to define the coordinate system to be used by the system. Calibration is discussed in more detail below.

After the system is calibrated, the system's operating parameters are defined at steps 103. This includes setting the system, for either the left- or right-handed orientation, depending on the golfer to be tested. The selection of the left-handed orientation requires the use of one set of coordinates for the left-handed golfer and right-handed system requires the use of another set of coordinates for a right-handed golfer. At this time, the system is also set up in either a test or a demonstration mode. If the test mode is selected, the system saves the test data. In the demonstration mode, the system does not save the data.

At step S103, additional data specific to the location of the test and the golfer is entered as well. Specifically, the operator enters data for atmospheric, environmental or ambient conditions such as temperature, humidity, wind speed and direction, elevation, and type of turf to be used in making the calculations for the golf ball flight, roll, and total distance. The operator also inputs the personal data of the golfer. This personal data includes name, age, handicap, gender, golf ball type (for use in trajectory calculations discussed below), and golf club used (type, club head, shaft, characteristics). Different types of golf balls have different predetermined data files with lift and drag information. The designation of the ball type provides information which indicates which data file of lift and drag information will be used in the calculations. Thus, the selection of the ball will alter the coefficient of lift $C_L$ and coefficient of drag $C_d$ data used in the calculation.

After this data is entered, the system is ready for use and moves to step S104. At step S104, the system waits for a sound trigger from the microphone. When there is a sound of a sufficient level or type, the system takes two images (as shown in FIG. 4), using the electronic shutters of the cameras 136, 138 (as shown in FIG. 6–6A) of the golf ball in the predetermined field-of-view, in preferably less than 2000 microseconds. The images recorded by the silicon panel 39 are used by the system to determine the launch conditions of the golf ball.

At steps S105–S107, the system uses several algorithms stored in the computer to determine the location of the golf ball relative to the monitor. After the computer has determined the location of the golf ball from the images, the system (and computer algorithms) determine the launch conditions. These determinations, which correspond to steps S105, S106, and S107, include locating the bright areas in the images, determining which of those bright areas correspond to the dots on the golf ball, and, then using this information to determine the location of the golf ball from the images, and calculate the launch conditions, respectively. Specifically, the system, at step S105, analyzes the images recorded by the cameras by locating the bright areas in the images. Since the golf ball preferably has 6 dots on it, the system should find twelve bright areas that represent the dots in the images from each of the cameras (2 images of the golf ball with 6 dots). The system then determines which of those bright areas correspond to the golf ball's reflective dots at step S106. As discussed in detail below this can be done in several ways.

If only twelve dots are found in the image, the system moves on to step S107 to determine, from the dots in the images, the position and orientation of the golf ball during the first and second images. However, if there are more or less than twelve dots or bright areas found in the images, then at step S108 the system allows the operator to manually edit the images. If too few bright areas are located, the operator adjusts the image brightness, and if too many are present, the operator may delete any additional bright areas. In some instances, the bright areas in the images may be reflections off of other parts of the golf ball or off the golf club head. If it is not possible to adequately adjust the brightness or eliminate those extraneous bright areas, then the system returns the operator to step S104 and the operator has the golfer hit another golf ball. If the manual editing of the areas is successful, however, then the system goes back to step S107.

At step S107, the system uses the identification of the dots in step S106 to determine the location of the centers of each of the twelve dots in each of the two images. Knowing the location of the center of each of the dots, the system can calculate at least one of the golf ball's spin axis of orientation, velocity, and direction information or launch angle and azimuth angle (i.e., the golfer's launch conditions). The azimuth angle is the deviation laterally from the flight path exhibited by the ball.

At step S109, the system uses the spin axis of orientation, velocity and direction information, as well as the environmental conditions and the golf ball information entered at step S103 to calculate the trajectory of the golf ball during the shot. The system estimates where the golf ball lands or carries, and even how far it rolls, and gives a total distance for the shot. Because the system is calibrated in three dimensions, the system also is able to calculate the azimuth angle or if the golf ball has been sliced or hooked, and how far the ball is off line.

This information (i.e., the golfer's launch conditions) is then presented to the golfer at step S110, in numerical and/or graphical formats. At step S111, the system can also calculate the same information as if a different golf ball had been used (e.g., a lower spinning rather than a higher spinning golf ball). It is also possible to determine what effect a variation in any of the launch conditions (golf ball speed, spin axis of rotation, launch angle or azimuth angle) would have on the results.

The golfer also has the option at step S112 to take more shots by returning the system to step S104. If the player chose the test mode at step S103 and several different shots were taken, at step S113 the system calculates and presents the average of all data accumulated during the test. At step S114, the system presents the golfer with the ideal launch conditions for the player's specific capabilities, thereby allowing the player to make changes and maximize distance. The system allows the golfer to start a new test with a new golf club, for example, at step S115, or to end the session at S116.

Figure 15:
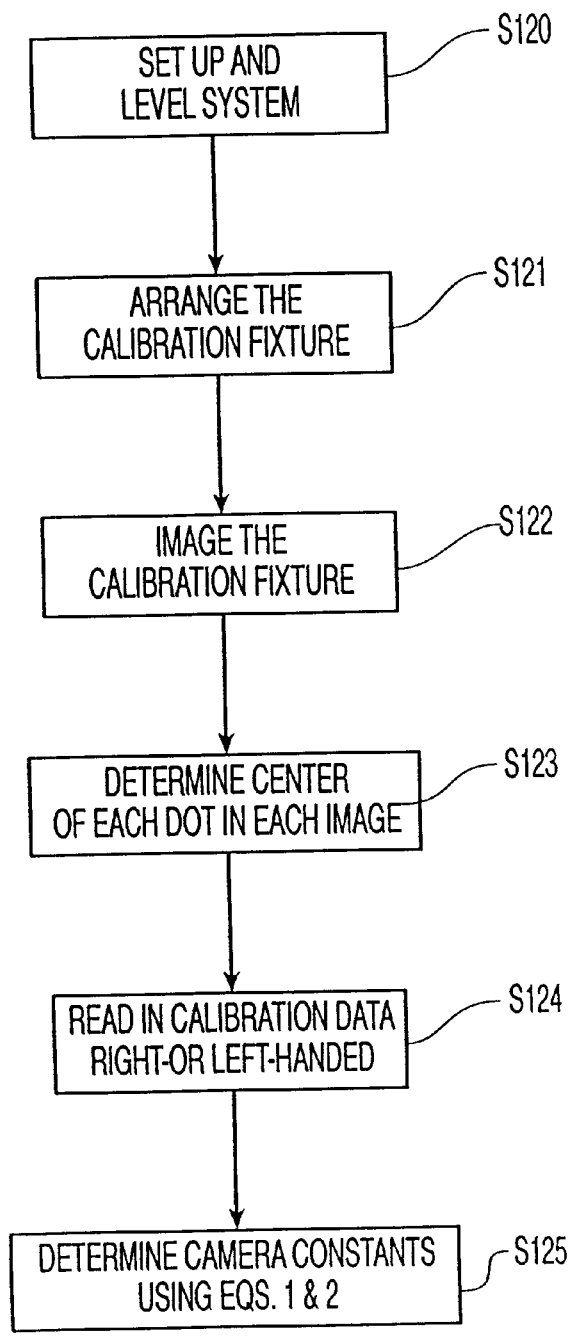
FIG. 15 is a flow chart describing calibration of the system.

Now turning to calibration step S102 in detail and turning to FIG. 15, the calibration of the system begins with setting up and leveling the system in step S120. The system is preferably set up on level ground, such as a practice tee or on a level, large field. Obviously, it is also possible to perform the tests indoors, hitting into a net. Referring to FIGS. 6–8, to level the system 100, the operator uses the threaded rods 128, 130 and nuts 132, 134. Referring to FIGS. 7–8, the system 100 is positioned to set the best view of the event and the predetermined field-of-view.

Referring again to FIGS. 15 and 7 at step S121, the calibration fixture 170 is placed in the appropriate location, which is at the end of the distance calibrators 158, 160. The calibration fixture 170 should be level and parallel to the system to ensure the best reflection of the light from the light source 142 (as shown in FIG. 10). Placing the calibration fixture at the end of the distance calibrators 158, 160 ensures that during the test, the calibration fixture 170 and the golf ball are in full view of each of the cameras. Both cameras take a picture of the calibration fixture and send the image to a buffer in step S122.

In step S123, the system, including a calibration algorithm, determines the location of the centers of the spots in each image corresponding to the calibration fixture's reflective dots. In one embodiment, the system locates the centers of these spots by identifying the positions of the pixels in the buffer that have a light intensity greater than a predetermined threshold value. Since the images are two-dimensional, the positions of the pixels have two components (x,y). The system searches the images for bright areas and finds the edges of each of the bright areas. The system then provides a rough estimate of the centers of each of the bright areas. All of the bright pixels in each of the bright areas are averaged and an accurate dot position and size are calculated for all 15 areas. Those with areas smaller than a minimum area are ignored.

Once the location of each of the dots on the calibration fixture with respect to camera are determined, the system should know the true spacing of the dots on the calibration fixture. As shown in FIG. 11, the calibration fixture 170 has dots 170a–o arranged in three rows and five columns. The X, Y, and Z coordinates of the center of each dot 170a–o, which are arranged in a three-dimensional pattern, were pre-measured to an accuracy of one of at least one thousandth of an inch on a digitizing table and stored in the computer. The system recalls the previously stored data of the three-dimensional positions of the dots on the calibration fixture relative to one another. The recalled data depends on whether a right-handed (X-axis points toward the golfer) or a left-handed (X-axis points away from the golfer) system is used. Both sets of data are stored and can be selected by the operator at step S124. An exemplary set of these three dimensional X, Y, Z positions for right-hand calibration for the calibration fixture with 15 dots appear below:

| (1) −1.5 3.0 0.0 | (2) 1.5 3.0 1.0 | (3) 0.0 3.0 2.0 |
| (4) 1.5 3.0 3.0 | (5) −1.5 3.0 4.0 | (6) −1.5 2.0 0.0 |
| (7) 1.5 2.0 1.0 | (8) 0.0 2.0 2.0 | (9) 1.5 2.0 3.0 |
| (10) −1.5 2.0 4.0 | (11) −1.5 1.0 0.0 | (12) 1.5 1.0 1.0 |
| (13) 0.0 1.0 2.0 | (14) 1.5 1.0 3.0 | (15) −1.5 1.0 4.0 |

An exemplary set of these three dimensional X, Y, Z positions for left-hand calibration for the calibration fixture with 15 dots appear below:

| | | |
|---|---|---|
| (1) 1.5 3.0 4.0 | (2) −1.5 3.0 3.0 | (3) 0.0 3.0 2.0 |
| (4) −1.5 3.0 1.0 | (5) 1.5 3.0 0.0 | (6) 1.5 2.0 4.0 |
| (7) −1.5 2.0 3.0 | (8) 0.0 2.0 2.0 | (9) −1.5 2.0 1.0 |
| (10) 1.5 2.0 0.0 | (11) 1.5 1.0 4.0 | (12) −1.5 1.0 3.0 |
| (13) 0.0 1.0 2.0 | (14) −1.5 1.0 1.0 | (15) 1.5 1.0 0.0 |

At step S125, using the images of the calibration fixture, the system determines eleven (11) constants relating image space coordinates U and V to the known fifteen X, Y, and Z positions on the calibration fixture. The equations relating the calibrated X(I), Y(I), Z(I) spaced points with the $U_i^j$, $V_i^j$ image points are:

$$U_i^j = \frac{D_{1j}X(i) + D_{2j}Y(i) + D_{3j}Z(i) + D_{4j}}{D_{9j}X(i) + D_{10j}Y(i) + D_{11j}Z(i) + 1} \quad \text{(Eq. 1)}$$

$$V_i^j = \frac{D_{5j}X(i) + D_{6j}Y(i) + D_{7j}Z(i) + D_{8j}}{D_{9j}X(i) + D_{10j}Y(i) + D_{11j}Z(i) + 1} \quad \text{(Eq. 2)}$$

where, i=1,15 and j=1,2.

The eleven constants, $D_{i1}$(I=1,11), for camera 136 (as shown in FIGS. 6–7) and the eleven constants, $D_{i2}$(I=1,11), for camera 138 (as shown in FIGS. 6–7) are solved from knowing X(I), Y(I), Z(I) at the 15 locations and the 15 $U_i^j$, $V_i^j$ coordinates measured in the calibration photo for the two cameras.

In another embodiment, during image analysis the system uses the standard Run Length Encoding (RLE) technique to locate the bright areas. The RLE technique is conventional and known by those of ordinary skill in the art. Image analysis can occur during calibration or during an actual shot. Once the bright areas are located using the RLE technique, the system then calculates an aspect ratio of all bright areas in the image to determine which of the areas are the reflective markers. The technique for determining which bright areas are the dots is discussed in detail below with respect to FIG. 16.

As discussed above, referring to FIG. 14 once the system is calibrated in step S102, the operator can enter data at step S103.

A golf ball is then set on a tee where the calibration fixture was located and the golfer takes a swing. The system is triggered when a sound trigger from the club hitting the golf ball is sent via microphone to the system. The electronic shutter is activated causing a first image to be recorded by both cameras. There is an intervening, predetermined time delay, preferably less than 1000 microseconds, before the electronic shutter is activated again. If the time delay is too long, the field-of-view may not be large enough to capture the golf ball in the cameras' views for both images. The cameras used in the systems 10 and 100 allow for both images (which occur during the first and the second electronic shutter activations) to be recorded in one image frame. Because the images are recorded when the electronic shutter is activated, the shutter activations can be as close together as needed.

This sequence produces an image of the reflections of light off of the printed dots on each light sensitive panel of the cameras. The location of the dots in each of the images are preferably determined with the RLE technique which was discussed for the calibration fixture.

Figure 16:
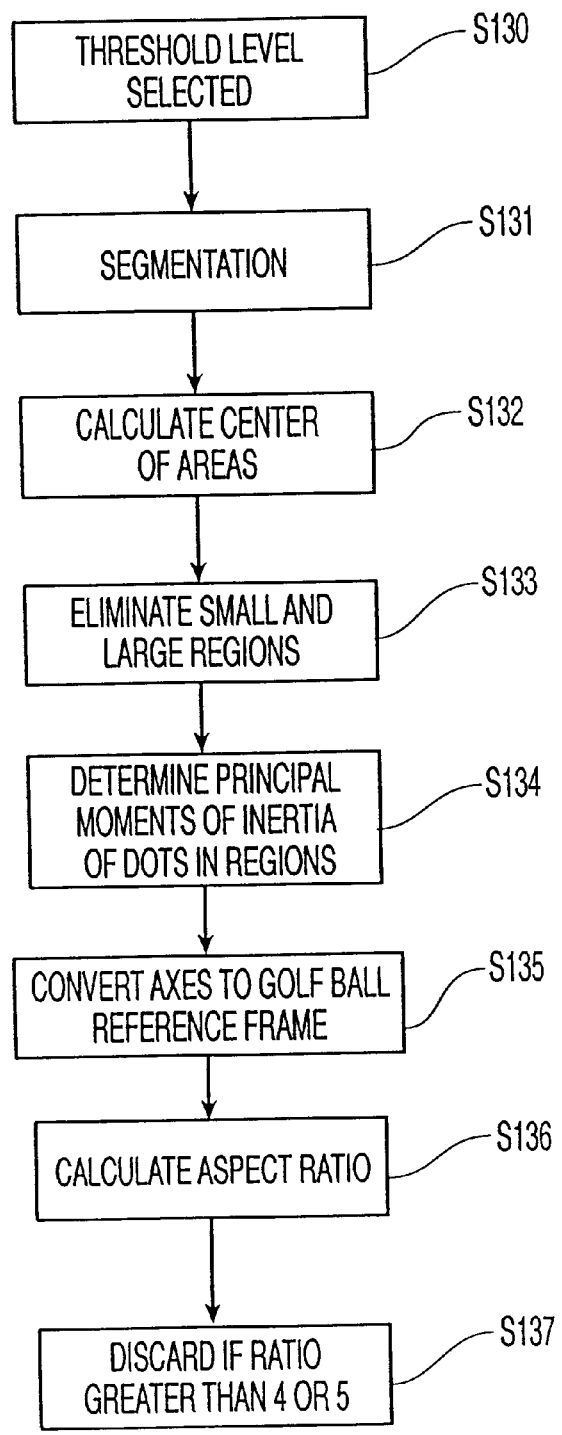
FIG. 16 is a flow chart describing determination of markers in an image.

The technique used for determining the aspect ratio to determine which bright areas are dots will now be described in conjunction with FIG. 16. As shown in step S130, the image has an appropriate brightness threshold level chosen. By setting the correct threshold level for the image to a predetermined level, all pixels in the image are shown either as black or white. At step S131, the images are segmented into distinct segments, corresponding to the bright areas in each of the images. The system, at step S132, determines the center of each area by first calculating the following summations at each of the segments using the following equations:

$$S_x = \Sigma X_i \quad \text{(Eq. 3)}$$

$$S_y = \Sigma Y_i \quad \text{(Eq. 4)}$$

$$S_{xx} = \Sigma X_i^2 \quad \text{(Eq. 5)}$$

$$S_{yy} = \Sigma Y_i^2 \quad \text{(Eq. 6)}$$

$$S_{xy} = \Sigma X_i Y_i \quad \text{(Eq. 7)}$$

Once these sums, which are the sums of the bright areas, have been accumulated for each of the segments in the image, the net moments about the x and y axis are calculated using the following equations:

$$I_x = S_{xx} - \frac{S_x^2}{AREA} \quad \text{(Eq. 8)}$$

$$I_y = S_{yy} - \frac{S_y^2}{AREA} \quad \text{(Eq. 9)}$$

$$I_{xy} = S_{xy} - \frac{S_x S_y}{AREA} \quad \text{(Eq. 10)}$$

where AREA is the number of pixels in each bright area.

At step S133, the system eliminates those areas of brightness in the image that have an area outside a predetermined range. Thus, areas that are too large and too small are eliminated. In the preferred embodiment, the dots on the golf ball are ¼"–⅛" and the camera has 753×244 pixels, so that the dots should have an area of about 105 pixels in the images. However, glare by specular reflection, including that from the club head and other objects, may cause additional bright areas to appear in each of the images. Thus, if the areas are much less or much more than 105 pixels, then the system can ignore the areas since they cannot be a marker on the golf ball.

For those areas that remain (i.e., that are approximately 105 pixels), the system determines which are the correct twelve in the following manner. The system assumes that the dots leave an elliptical shape in the image due to the fact that the dots are round and the golf ball's movement during the time that the electronic shutter is activated. Therefore, at step S134 the system then calculates the principal moments of inertia of each area using the following equations:

$$I_{x'} = \frac{I_x + I_y}{2} + \sqrt{\left(\frac{I_x - I_y}{2}\right)^2 + I_{xy}^2} \quad \text{(Eq. 11)}$$

$$I_{y'} = \frac{I_x + I_y}{2} - \sqrt{\left(\frac{I_x - I_y}{2}\right)^2 + I_{xy}^2} \quad \text{(Eq. 12)}$$

Next, the system converts the dot locations (determined at step S135, FIG. 16) in the golf ball coordinate system to the reference global system of the calibrated cameras 136, 138 using the following matrix equation:

$$\begin{bmatrix} x_g \\ y_g \\ z_g \end{bmatrix} = \begin{bmatrix} T_x \\ T_y \\ T_z \end{bmatrix} + \begin{bmatrix} M_{11} & M_{12} & M_{13} \\ M_{21} & M_{22} & M_{23} \\ M_{31} & M_{32} & M_{33} \end{bmatrix} \begin{bmatrix} x_b \\ y_b \\ z_b \end{bmatrix} \quad \text{(Eq. 13)}$$

where Xg, Yg, Zg are the global coordinates of the center of the golf ball. The column vector, $T_x, T_y, T_z$, is the location of the center of the golf ball in the global coordinate system. The matrix elements $M_{ij}$ (i=1,3; j=1,3) are the direction cosines defining the orientation of the golf ball coordinate system relative to the global system. The three angles $a_1, a_2, a_3$ describe the elements of matrix $M_{ij}$ in terms of periodic functions. Substituting matrix equation for the global position of each reflector into the set of four linear equations shown above, a set of 24 equations result for the six unknown variables ($T_x, T_y, T_z, a_1, a_2, a_3$). A similar set of 24 equations are solved for the second image of the golf ball. Typically, the solution of the three variables $T_x, T_y, T_z$ and the three angles at $a_1, a_2, a_3$ that prescribed the rotation matrix M is solvable in four iterations for the 24 equations that are simultaneously satisfied.

The kinematic variables, three components of translational velocity and three components of angular velocity in the global coordinate system, are calculated from the relative translation of the center of mass and relative rotation angles that the golf ball makes between its two image positions.

The velocity components of the center of mass $V_x, V_y, V_z$ along the three axes of the global coordinate system are given by the following equations:

$$V_x = \frac{T_x(t + \Delta T) - T_x(t)}{\Delta T};$$

$$V_y = \frac{T_y(t + \Delta T) - T_y(t)}{\Delta T};$$

$$V_z = \frac{T_z(t + \Delta T) - T_z(t)}{\Delta T}$$

(Eqs. 14, 15 and 16, respectively) in which t is the time of the first electronic shutter measurement of $T_x, T_y, T_z$ and $\Delta T$ is the time between images.

The spin rate components in the global axis system result from obtaining the product of the inverse orientation matrix, $M^T(t)$ and $M(t+\Delta T)$. The resulting relative orientation matrix, A, $A(t,t+\Delta t)=M(t+\Delta t)M^T(t)$, measures the angular difference of the two electronic shutter golf ball images.

The magnitude $\Theta$ of the angle of rotation about the spin axis during the time increment $\Delta T$ is given by:

$$\theta = \sin^{-1}\left(\frac{R}{2}\right) \quad \text{(Eq. 17)}$$

here, $R=\sqrt{l^2+m^2+n^2}$; $l=A_{32}-A_{23}$; $m=A_{13}-A_{31}$; and $n=A_{21}-A_{12}$.

The three orthogonal components of spin rate, $W_x, W_y, W_z$, are given by the following equations:

$$W_x = \frac{\Theta L}{R\Delta t} \quad \text{(Eq. 18)}$$

$$W_y = \frac{\Theta M}{R\Delta t} \quad \text{(Eq. 19)}$$

$$W_z = \frac{\Theta N}{R\Delta t} \quad \text{(Eq. 20)}$$

Finally, at step S136 the aspect ratio is calculated using the following equation:

$$R = \frac{l_{x'}}{l_{y'}} \quad \text{(Eq. 21)}$$

and the dot is rejected at step S137 if the aspect ratio is greater than four or five.

Returning to FIG. 14, once the locations of the dots are determined, the system computes the translational velocity of the center of the golf ball and angular velocity (spin rate) of the golf ball at step S107 in the following manner. First, the system uses the triangulation from the data of cameras to locate the position of the six dots on the surface of the golf ball. Specifically, the system solves the set of four linear equations shown below to determine the position (x,y,z) in the golf ball's coordinate system of each dot on the surface of the golf ball.

$$(D_{9,1}U^1-D_{1,1})x+(D_{10,1}U^1-D_{2,1})y+(D_{11,1}U^1-D_{3,1})z+(U^1-D_4)\quad\text{(Eq. 22)}$$

$$(D_{9,1}V^1-D_{5,1})x+(D_{10,1}V^1-D_{6,1})y+(D_{11,1}V^1-D_{7,1})z+(V^1-D_{8,1})\quad\text{(Eq. 23)}$$

$$(D_{9,2}U^2-D_{1,2})x+(D_{10,2}U^2-D_{2,2})y+(D_{11,2}U^2-D_{3,2})z+(U^2-D_4)\quad\text{(Eq. 24)}$$

$$(D_{9,2}V^2-D_{5,2})x+(D_{10,2}V^2-D_{6,2})y+(D_{11,2}V^2-D_{7,2})z+(V^2-D_{8,2})\quad\text{(Eq. 25)}$$

where $D_{ij}$ are the eleven constants determined by the calibration method at steps S102 (FIG. 14) and S125 (FIG. 15), where i identifies the constant and j identifies the image.

At step S109 of FIG. 14, the system, including a computer algorithm, then computes the trajectories for the tests using the initial velocity and initial spin rate which were computed in step S107. For each time increment, the system interpolates the forces on the golf ball at time T and calculates the velocity at time T+1 from the velocity of the golf ball and the forces on the golf ball at time T. Next, the system computes the mean velocity and the Reynold's number, which is the ratio of the flow's inertial forces to the flow's viscous forces during the time interval from time T to time T+1. The system then interpolates the mean forces, from which the system calculates the velocity at time T+1. The forces include the drag force, the lift due to the spin of the golf ball, and gravitational forces. Using the velocity at time T+1, the system can compute the position at time T+1. Finally, the system computes the spin rate at time T+1. In the preferred embodiment, the length of the time interval is 0.1 seconds. This calculation is performed until the golf ball reaches the ground.

The system uses the following equations to perform these calculations. For the drag force on the golf ball, the force is calculated by:

$$F_d = C_d * 1/2 * \rho * |V^{Bf}|^2 * A; \quad \text{(Eq. 26)}$$

where $C_d$=drag coefficient previously determined and stored in a data file that is called when the golf ball type is selected;

$\rho$=density of air–entered at step S103, the beginning of the test;

$|V^{Bf}|$=magnitude of the velocity of the golf ball; and

A=the cross-sectional area of the golf ball—also predetermined once the golf ball selected.

The lift, caused by the spin of the golf ball, is perpendicular to the velocity direction and spin direction and is given by:

$$n_L = N_\omega \times n_{VB}, \quad \text{(Eq. 27)}$$

where $n_L$, $N_\omega$, and $n_{VB}$ are the direction cosines of the lift force, the angular rotation of the golf ball, and the velocity of the golf ball, respectively.

The magnitude of the lift is given by:

$$F_L = C_L * 1/2 * \rho * |V^{Bf}|^2 * A \quad \text{(Eq. 28)}$$

where $C_L$ is the lift coefficient and the other terms being defined above.

Therefore, the applied aerodynamic force on the golf ball becomes $$R^B = n_L F_L - n_{VB} F_d \quad \text{(Eq. 29)}$$

The velocity and spin of the golf ball are then transformed into the X, Y, and Z directions so that generalized velocities and rotational velocities are given by $$V^{Bf} = u_9 X + u_{10} Y + u_{11} Z \quad \text{(Eq. 30)}$$

$$\omega^{Bf} = u_{12} X + u_{13} Y + u_{14} Z \quad \text{(Eq. 31)}$$

where $u_9$, $u_{10}$, and $u_{11}$ are the velocities in the X, Y, and Z directions; and $u_{12}$, $u_{13}$, and $u_{14}$ are the spin velocities in the X, Y, and Z directions.

Using equations Eqs. 26–30 the system obtains the following second order differential equations:

$$n_{1x} * F_1 - n_{Vbx} * F_d - m_B * u_9 = 0 \quad \text{(Eq. 32)}$$

$$n_{1y} * F_1 - n_{Vby} * F_d - m_B * u_{10} = 0 \quad \text{(Eq. 33)}$$

$$n_{1z} * F_1 - n_{Vbz} \cdot F_d - m_B * u_{11} - m_B * g = 0 \quad \text{(Eq. 34)}$$

where $n_{1x}$, $n_{1y}$, $n_{1z}$ are the direction cosines of the force in the X, Y, and Z directions, respectively;

$n_{Vbx}$, $n_{Vby}$, and $n_{Vbz}$ are the directions of the velocity vectors in the X, Y, and Z directions, respectively;

$m_B$ is the mass of the ball; and $m_B * g$ relates to the gravitational force exerted on the golf ball in the Z direction.

The second order differential equations Eqs. 32–34 are then solved for each time step, preferably every 0.1 second using the drag and lift coefficients ($C_d$ and $C_L$) from data files, or from another source, based upon the velocity ($V^{Bf}$) and angular velocity ($\omega^{Bf}$) at each of those time steps.

Figure 17:
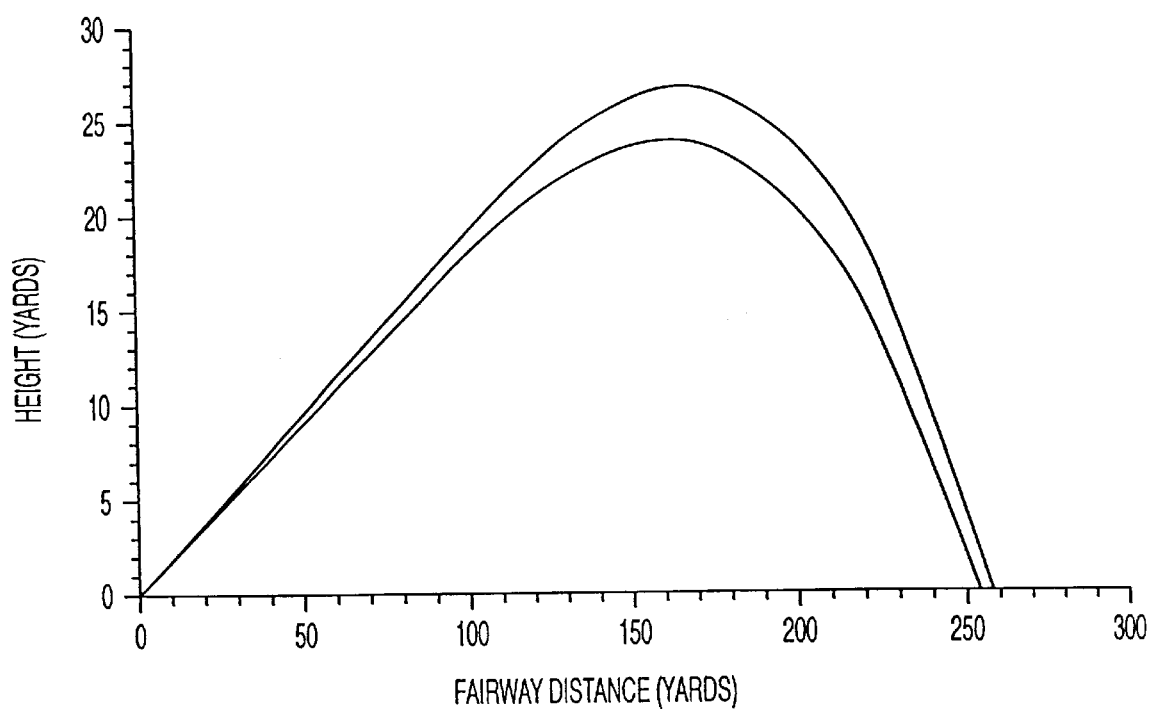
FIG. 17 is a graph showing trajectories of golf balls as calculated by the system.

The trajectory method repeats this procedure for successive time intervals until the computed elevation component of the golf ball's position is less than a predetermined elevation, usually zero or ground level. Referring to FIG. 17, when the golf ball reaches ground level, the method interpolates to compute the ground impact conditions including final velocity, trajectory time, impact angle, and spin rate. Using a roll model based on empirical data and golf ball data input by the operator, the system computes the final resting position of the golf ball using the just-computed ground impact conditions. Accordingly, the system computes the total distance from the tee to the final resting position of the golf ball. A data file stores the results computed by the trajectory method.

At step S112 (shown in FIG. 14), the system then determines whether an additional test should be performed. If additional tests are to be performed, the process described above repeats, beginning at step S104 with the sound trigger through step S110 where the trajectory method computes and presents the trajectory for the golf ball.

When all tests have been performed, the analysis method computes statistics for each golf ball type used in the tests and presents the results to the operator. For the group of tests performed for each golf ball type, the system computes the average value and standard deviation from the mean for several launch characteristics including the velocity, the launch angle, the side angles, the backspin, the side spin, and the carry and roll. The total spin rate has three orthogonal components on the axis of rotation. Back spin and side spin are two of the components, $W_x$ and $W_y$, of the spin rate discussed earlier.

Different factors contribute to the standard deviation of the measurements including the variation in the compression and resilience of the golf balls, the variation in the positioning of the dots on the golf balls, the pixel resolution of the light sensitive panels and the accuracy of the pre-measured dots on the calibration fixture. Obviously, the primary source of scatter lies in the swing variations of the typical golfer.

Upon request from the operator, the system displays the test results in various forms. For example, the system displays individual results for the golf ball type selected by the operator.

Similarly, the system in step S113 can also display tabular representations of the trajectories for the golf ball types selected by the operator. The tabular representation presents trajectory information including distance, height, velocity, spin and the launch angles. Similarly, the analysis method displays graphical representation of the trajectories for the golf ball types selected by the operator. The system computes the graphical trajectories from the average launch conditions computed for each golf ball type.

Figure 18:
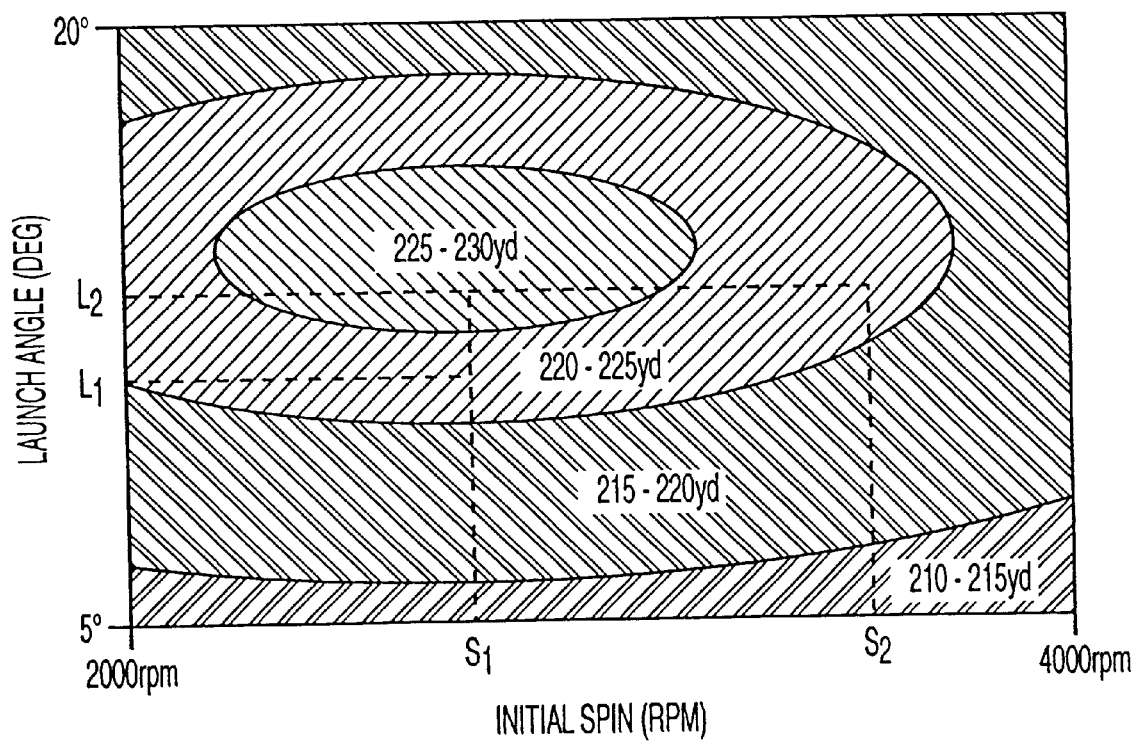
FIG. 18 is an example of a contour map of the total distance a golf ball travels under specified conditions.

At step S113, the system displays the average of each of the shots taken by the golfer. The results are displayed in a tabular and/or graphical format. The displayed results include the total distance, the spin rate, the launch angle, carry, and golf ball speed. From this information, the system at step S114 shows the golfer the results if the launch angle and spin rate of the golf ball were slightly changed, allowing the golfer to optimize the equipment and/or swing. As shown in FIG. 18, the distance the golf ball travels is dependent on the initial spin rate and launch angle for a given golf ball speed. It is assumed that the golfer is unable to increase the golf ball speed, which in turn is determined by the club head speed. One way to significantly increase the golf ball and club head speed, is to increase the shaft length. However, increasing the shaft length may change other variables, including the launch angle and spin rate, so a new set of tests should be done.

At step S114 in FIG. 14, the system calculates the distances of a golf ball struck at a variety of launch angles and spin rates that are close to those for the golfer. The operator is able to choose which launch angles and spin rates are used to calculate the distances. One example is shown in FIG. 18. In this example, the system calculated the distances that a golf ball having an initial velocity of 130 mph travels for launch angles of 0° to 15° and having initial spin rates from 2000 rpm to 4000 rpm. In order to display this particular data, the system performs the trajectory calculations described above between about 50–100 times (several predetermined values of launch angles and several predetermined values of initial spin rates). The operator can dictate the range of launch angles and spin rates the system should use, as well as how many values of each the system uses in the calculations. From the graphical data in FIG. 18, the golfer can determine which of these two variables could be changed to improve the distance.

Using FIG. 18, if the golfer had a launch angle of $L_2$ degrees and a spin rate of $S_2$ rpm, the golfer would attain a distance within the range of 220 to 225 yards. If the golfer reduced the spin rate from $S_2$ rpm to $S_1$ rpm, the distance attained would increase to the range of 225 to 230 yards. Similarly at a spin rate of $S_1$, a change in the launch angle from $L_1$ degrees to $L_2$ degrees would also increase the distance. The spin rate and launch angle can be altered simultaneously to change the distances. Knowing this information, the golfer can make the appropriate adjustments to achieve this increase in distance.

Since the golfer's data is saved, when the system is in the test mode, it is also possible to compare the golfer's data with that of other golfers, whose data were also saved. In this way, it is possible for golfers to have their data (launch angle, initial golf ball speed, spin rate, etc.) compared to others. This comparison may be done in a tabular or graphical format. Similarly, the system may compare the data from successive clubs (e.g., a 5-iron to a 6-iron to a 7-iron) to determine if there are gaps in the clubs (inconsistent distances between each of the clubs). Alternatively, two different golfers could be compared using the same or different clubs, or the same or different balls.

While the above invention has been described with reference to certain preferred embodiments, it should be kept in mind that the scope of the present invention is not limited to these embodiments. For example, one camera could be used in a system similar to that described in the second embodiment. One skilled in the art may find variations of these preferred embodiments which, nevertheless, fall within the spirit of the present invention, whose scope is defined by the claims set forth below.

Therefore, it is understood that the appended claims are intended to cover all such modifications and embodiments which come within the spirit and scope of the present invention.

What is claimed is:

1. A launch monitor system for measuring launch conditions of an object moving in a predetermined field-of-view, the system comprising:
   a light source directing light into the predetermined field-of-view at least when the object is in the predetermined field-of-view;
   a first camera unit pointed toward the predetermined field-of-view, wherein the first camera unit captures at least a first pair of images of the object on a single frame while the object is moving in the predetermined field-of-view, and wherein the first pair of images correspond to electronic activations of a first electronic shutter;
   a second camera unit pointed toward the predetermined field-of-view, wherein the second camera unit captures at least a second pair of images of the object on a single frame while the object is moving i the predetermined field-of-view, and wherein the second pair of images correspond to electronic activations of a second electronic shutter;
   a computer to control the system and determine the launch conditions of the object from said images;
   a calibration fixtore having reflective markings in at least three different planes;
   a line-of-sight of each camera unit; and
   at least one telescoping member for calibrating the system, wherein said calibration fixture includes a receiving element for receiving an end portion of said telescoping member, thereby placing the calibration fixture at an intersection of line-of-sight of the camera units.

2. The launch monitor system of claim 1, further including a support structure having the first camera unit disposed thereon.

3. The launch monitor system of claim 2, wherein the object has a flight path and the light source is aligned in a direction perpendicular to the flight path and the support structure includes support elements attached to a lower portion thereof for allowing movement of the system in a direction parallel to the flight path.

4. The launch monitor system of claim 2, wherein the object is a golf ball.

5. The launch monitor system of claim 4, wherein at least three reflective markers are placed on the golf ball.

6. The launch monitor system of claim 4, wherein at least six reflective markers are placed on the golf ball.

7. The launch monitor system of claim 6, wherein the reflective markers are painted fluorescent markers.

8. The launch monitor system of claim 7, further including a first light reflecting element directing light into the predetermined field-of-view.

9. The launch monitor system of claim 8, wherein the first light-reflecting element is disposed relative to the light source and the predetermined field-of-view for reflecting the light from the light source into the predetermined field-of-view.

10. The launch monitor system of claim 1, wherein the light source is disposed generally between the first and second camera units.

11. The launch monitor system of claim 1, wherein the light source is the sun.

12. The launch monitor system of claim 1, wherein the first and second cameras are charge coupled device cameras.

13. The launch monitor system of claim 12, wherein the charge coupled devices comprise 753 pixels×244 pixels.

14. The launch monitor system of claim 1, wherein the cameras are charge coupled device cameras and the line-of-sight angles for the charge coupled devices are about 22°.

15. The launch monitor system of claim 1, further comprising at least one frame grabber in the computer.

16. The launch monitor system of claim 1, wherein the computer causes electronic activation of the first and second electronic shutters while the object is moving in the predetermined field-of-view.

17. The launch monitor system of claim 16, wherein reflective markers are placed on the object, and wherein the reflective markers are selected from the group consisting of fluorescent, retro-reflective, colored, or infrared markers.

18. The launch monitor system of claim 1, wherein the light source is simultaneously activated while the object is in the field-of-view.

19. The launch monitor system of claim 1, wherein the computer includes an algorithm for determining launch conditions of the object from the images, the launch conditions including at least one of spin axis of rotation, velocity, launch angle or azimuth angle.

20. The launch monitor system of claim 1, wherein the computer includes an algorithm for determining from the images a position and an orientation of the object each time the first and second electronic shutters are activated and means for determining chokes in position and orientation of the object between images.

21. The launch monitor system of claim 1, further comprising an initiator for activating the system.

22. The launch monitor system of claim 21, wherein the initiator is a microphone, the microphone sending a signal to the computer in response to the object being struck by a golf club to activate the electronic shutters and capture images of the object.

23. The launch monitor system of claim 22, wherein the signal also activates the light source.

24. The launch monitor system of claim 1, wherein the first and second pairs of images are captured in about 2000 milliseconds or less.

25. The launch monitor system of claim 24, wherein the first and second pairs of images are captured in about 1000 milliseconds or less.

26. A launch monitor system for measuring launch conditions of an object moving in a predetermined field-of-view, the system comprising:

a light source directing light into the predetermined field-of-view at least when the object is in the predetermined field-of-view;

a first camera unit including an electronic shutter, said camera being pointed toward the predetermined field-of-view to create at least one image of the object while moving in the predetermined field-of-view;

a second camera unit including an electronic shutter, said camera being pointed toward the predetermined field-of-view to create at least one image of the object while moving in the predetermined field-of-view; and a computer to control the system and determine the launch conditions of the object from said images, wherein each of the camera units has a line-of-sight, and the lines-of-sight intersect at an intersection located at a predetermined distance from the system that lies within the predetermined field-of-view, and a distance calibrator includes an extendable member whose extended length corresponds to the distance from the system to said intersection of the lines-of-sight of the camera units.

27. The launch monitor system of claim 26, wherein the distance calibrator further comprises reflective markings in at least three different planes.

28. The launch monitor system of claim 26, wherein the first and second camera units are charge coupled device cameras.

29. The launch monitor system of claims 28, wherein the charge coupled devices comprise 753 pixels×244 pixels.

30. The launch monitor system of claim 26, wherein the computer activates the electronic shutters at least one time while the object is moving in the predetermined field-of-view.

31. The launch monitor system of claim 30, wherein at least six reflective markers selected from the group consisting of fluorescent, retro-reflective, colored, infrared markers, and combinations thereof are placed on the object.

32. The launch monitor system of claim 31, wherein the object is a golf ball.

33. The launch monitor system of claim 26, wherein the first and second camera units each create at least two images of the object while moving in the predetermined field-of-view.

34. The launch monitor system of claim 33, wherein the at least two images are captured in about 2000 milliseconds or less.

35. The launch monitor system of claim 34, wherein the at least two images are captured in about 1000 milliseconds or less.

36. A launch monitor system for measuring launch conditions of an object moving in a predetermined field-of-view, the system comprising:

a light source directing light into the predetermined field-of-view at least when the object is in the predetermined field-of-view;

a first camera unit including an electronic shutter, said camera being pointed toward the predetermined field-of-view to create at least one image of the object while moving in the predetermined field-of-view;

a second camera unit including an electronic shutter, said camera being pointed toward the predetermined field-of-view to crate at least one image of the object while moving in the predetermined field-of-view; and a computer to control the system and determine the launch conditions of the object from said images, wherein the computer activates the first and second electronic shutters at least one time while the object is moving in the predetermined field-of-view, wherein each of the camera units has a line-of-sight, and the lines-of-sight intersect at an intersection located at a predetermined distance from the system that lies within the predetermined field-of-view, and a distance calibrator includes an extendable member whose extended length corresponds to the distance from the system to said intersection of the lines-of-sight of the camera units.

37. The launch monitor system of claim 36, wherein the object is a golf ball.

38. The launch monitor system of claim 36, wherein the first and second camera units each create at least two images of the object while moving in the predetermined field-of-view.

39. The launch monitor system of claim 36, wherein the first and second camera units are charge coupled device cameras.

40. The launch monitor system of claim 39, wherein the charge coupled devices comprise 753 pixels×244 pixels.

41. The launch monitor system of claim 36, wherein the at least two images are created in about 2000 milliseconds or less.

42. The launch monitor system of claim 41, wherein the at least two images are created in about 1000 milliseconds or less.

* * * * *